US012516460B2

(12) United States Patent
Byun et al.

(10) Patent No.: US 12,516,460 B2
(45) Date of Patent: Jan. 6, 2026

(54) ENGINEERED NON-WOVEN TEXTILE AND METHOD OF MANUFACTURING

(71) Applicant: NIKE, Inc., Beaverton, OR (US)

(72) Inventors: EunYoung Byun, Busan (KR); Kevin R. Derr, Portland, OR (US); Martin E. Evans, Portland, OR (US); HoEun Kim, Busan (KR); Eun Kyung Lee, Beaverton, OR (US); Gwen Marks, Portland, OR (US); Matthew D. Nordstrom, Portland, OR (US); Todd A. Waatti, Battle Ground, WA (US); Chun-Hao Hsu, Changhua County (TW); HyunWoo Jeon, Busan (KR); Hyo Young Kim, Busan (KR); TaeYoon Kim, Busan (KR); I-Han Lan, Taichung (TW); Yi-Chia Liang, Changhua County (TW)

(73) Assignee: NIKE, Inc., Beaverton, OR (US)

( * ) Notice: Subject to any disclaimer, the term of this patent is extended or adjusted under 35 U.S.C. 154(b) by 201 days.

(21) Appl. No.: 17/945,021

(22) Filed: Sep. 14, 2022

(65) Prior Publication Data
US 2023/0081164 A1    Mar. 16, 2023

Related U.S. Application Data

(60) Provisional application No. 63/243,960, filed on Sep. 14, 2021.

(51) Int. Cl.
*D04H 3/12* (2006.01)
*A43B 1/05* (2022.01)
(Continued)

(52) U.S. Cl.
CPC ............... *D04H 3/12* (2013.01); *A43B 1/05* (2022.01); *B32B 5/024* (2013.01); *B32B 5/18* (2013.01);
(Continued)

(58) Field of Classification Search
CPC ........ D10B 2501/043; D10B 2401/061; B32B 2437/02; B32B 2307/51; B32B 2305/20;
(Continued)

(56) References Cited

U.S. PATENT DOCUMENTS 2,812,797 A    11/1957  Estee et al.
3,000,432 A     9/1961  Olken
(Continued)

FOREIGN PATENT DOCUMENTS

CN        1769562 A    5/2006
CN      107938177 A    4/2018
(Continued)

*Primary Examiner* — Vishal I Patel
(74) *Attorney, Agent, or Firm* — Quinn IP Law

(57) ABSTRACT

A method of creating an engineered textile includes placing a yarn-wound jig on an upper surface of a substrate, selectively printing or extruding a bonding material across the plurality of arranged yarn strands, solidifying the bonding material to bond adjacent ones of the plurality of arranged yarn strands together and form a bound plurality of arranged yarn strands, and removing the bound plurality of arranged yarn strands from the substrate and the frame.

16 Claims, 21 Drawing Sheets

(51) Int. Cl.
*B32B 5/02* (2006.01)
*B32B 5/18* (2006.01)
*B32B 5/24* (2006.01)
*B32B 5/26* (2006.01)
*B32B 7/14* (2006.01)
*B32B 37/00* (2006.01)
*B32B 37/12* (2006.01)
*B32B 37/24* (2006.01)
*D04H 3/04* (2012.01)
*D04H 3/05* (2006.01)

(52) U.S. Cl.
CPC .............. *B32B 5/245* (2013.01); *B32B 5/275* (2021.05); *B32B 7/14* (2013.01); *B32B 37/0076* (2013.01); *B32B 37/1292* (2013.01); *B32B 37/24* (2013.01); *D04H 3/04* (2013.01); *D04H 3/05* (2013.01); *B32B 2250/02* (2013.01); *B32B 2250/20* (2013.01); *B32B 2255/02* (2013.01); *B32B 2255/26* (2013.01); *B32B 2305/022* (2013.01); *B32B 2305/188* (2013.01); *B32B 2305/20* (2013.01); *B32B 2307/51* (2013.01); *B32B 2437/02* (2013.01); *D10B 2401/061* (2013.01); *D10B 2501/043* (2013.01)

(58) Field of Classification Search
CPC ........ B32B 2305/188; B32B 2305/022; B32B 2255/26; B32B 2255/02; B32B 2250/20; B32B 2250/02; B32B 37/24; B32B 37/1292; B32B 37/0076; B32B 7/14; B32B 5/245; B32B 5/18; B32B 5/024; B32B 5/275; D04H 3/05; D04H 3/04; D04H 3/12; A43B 1/05

See application file for complete search history.

(56) References Cited

U.S. PATENT DOCUMENTS

| | | | |
|---|---|---|---|
| 3,639,954 | A | 2/1972 | Kirzinger et al. |
| 3,878,591 | A | 4/1975 | Jense |
| 5,772,821 | A | 6/1998 | Yasui et al. |
| 7,120,975 | B2 | 10/2006 | Delecroix |
| 8,141,215 | B2 | 3/2012 | Yoshikawa et al. |
| 10,874,172 | B2 | 12/2020 | Corcoran-Tadd |
| 2003/0052212 | A1 | 3/2003 | Anderson et al. |
| 2003/0140467 | A1 | 7/2003 | Cahuzac et al. |
| 2006/0090314 | A1 | 5/2006 | Delecroix |
| 2007/0090564 | A1 | 4/2007 | Delecroix et al. |
| 2009/0126875 | A1 | 5/2009 | Uozumi et al. |
| 2010/0071177 | A1 | 3/2010 | Yoshikawa et al. |
| 2010/0218902 | A1 | 9/2010 | Yoshikawa et al. |
| 2019/0307208 | A1* | 10/2019 | Corcoran-Tadd ................ A43B 23/0265 |

FOREIGN PATENT DOCUMENTS

| | | |
|---|---|---|
| CN | 212826966 U | 3/2021 |
| DE | 3003666 A1 | 8/1981 |
| EP | 3549470 A1 | 10/2019 |
| WO | 2021087247 A1 | 5/2021 |

\* cited by examiner

ENGINEERED NON-WOVEN TEXTILE AND METHOD OF MANUFACTURING

CROSS-REFERENCE To RELATED APPLICATIONS

The present disclosure claims the benefit of priority from U.S. Provisional Patent No. 63/243,960, filed 14 Sep. 2021, which is incorporated by reference in its entirety and for all that it discloses.

TECHNICAL FIELD

The present disclosure relates generally to engineered textiles and other yarn-based composite structures. More specifically, aspects of this disclosure relate to systems, methods, and devices for automated fabrication of engineered textiles for footwear and apparel.

BACKGROUND

In typical apparel production, discrete patterns/panels are cut from a pre-produced roll of fabric and then seamed together to form the final article. To maintain its integrity as a sheet, the rolled fabric must include its own intrinsic structure, which often takes the form of a weave or knit. In many instances, this structure is needed only to provide integrity to the cloth, and has no functional purpose in the completed article.

In certain items of functional apparel (e.g., footwear, sports bras, compression gear (e.g., shorts, pants, shirts, sleeves), joint braces (e.g., ankle, knee, wrist, elbow), and certain wearable accessories), the performance of the article depends on certain strength and/or elasticity in specific directions. For example, a compression sleeve for a leg may require a particular circumferential elasticity to provide optimal compression, though may also require a particular longitudinal elasticity across the anterior portion of the knee to permit joint flexure. Footwear involves even more complex motions with lateral containment requirements to promote stability on the footbed, pronation/supination, and dorsiflexion during a typical gait. In many instances, the intrinsic structure of pre-produced/rolled fabrics is suboptimally arranged to meet the functional demand requirements of the article. As such, secondary structure must be applied (e.g., reinforcing cables, or secondary sections of fabric), which can contribute to increased material usage/waste (i.e., additional die-cut patterns and the off-cut waste associated with them) and increased weight in the final article.

Figure 1:
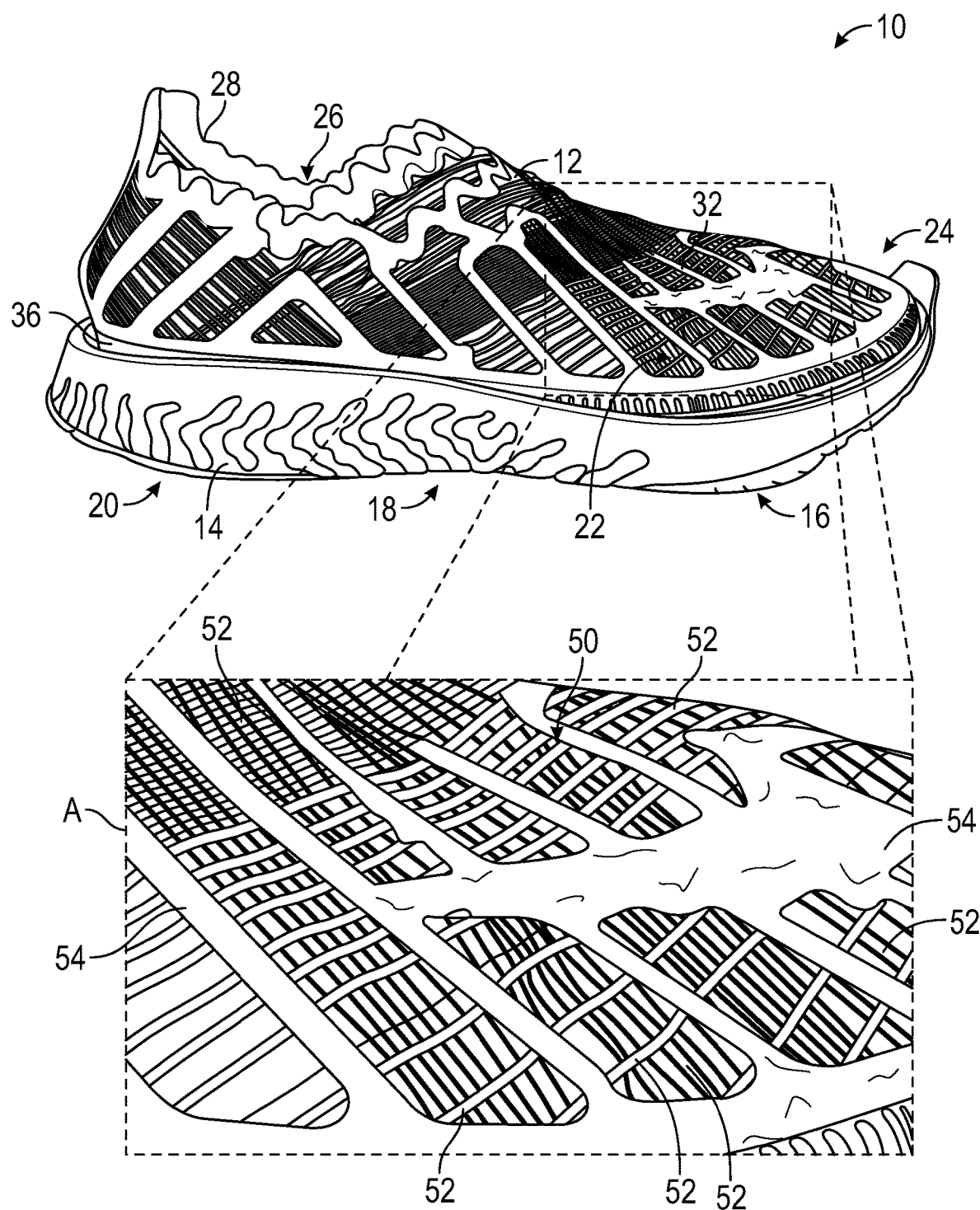
FIG. 1 is a schematic a side profile of an article of footwear having an upper that incorporates an embodiment of a polymer-bound nonwoven engineered textile.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

The present disclosure broadly relates to non-woven engineered textiles and/or textile-like composite structures, methods for creating the same, and the integration and use of such textiles in constructing articles of apparel, including, without limitation, articles of functional apparel. As used herein, the term "functional apparel" is intended to include any article of apparel or footwear that has a use or purpose beyond simply aesthetics or body coverage. Examples of functional apparel may include articles of footwear, bras (e.g., sports bras), compression gear (e.g., shorts, pants, shirts, sleeves), joint braces (e.g., ankle, knee, wrist, elbow), and/or accessories or wearables (e.g., backpacks, bags, watch bands).

The present concepts detail a new way to construct a fabric that both reduces off-cut waste and tailors the intrinsic structure of the fabric to the specific functional requirements of the final article. In doing so, an apparel/footwear designer may have more design freedom to specify directional elasticities and strength of the fabric and final article without adding additional weight or secondary reinforcing structure.

In general, the present designs/techniques create a new class of application-specific, textile-like composite structures that are engineered to provide specific dimensional material properties that are tailored to the end use of the textile. For the purpose of this disclosure, these composite structures will be broadly referred to as "engineered textiles". Such engineered textiles may have a material structure that includes a plurality of oriented and non-interlocking yarn strands that extend across a respective pattern/panel and that are selectively secured together via the application of an overlaid bonding material. By forming the engineered textile in this manner, the yarn strands may be aligned with the expected load paths or the directions of expected tensile loading in the final article. Moreover, the elasticity of each yarn strand may be selected to control the dynamic response of the engineered textile to the applied load during use.

Such designs are unlike and distinguishable from traditional textiles that are typically produced in bulk and often utilize a generic or repeating yarn structure (i.e., which is application agnostic). Such traditional textiles, often derive their material structure from the physical engagement or interlocking of adjacent yarn strands, such as by weaving, looping, knitting, knotting, or the like. Since the patterns/panels used to construct the article are often cut from continuous bolts of generically constructed fabric, a designer has little ability to control or vary the localized material properties of a pattern/panel absent the inclusion of additional reinforcing structure. Thus, by providing a designer with specific control of material parameters across the panel, the engineered textiles of the present disclosure may result in a more optimal/optimized structure that is both lighter and requires less secondary reinforcement than a traditional textile material.

While the present techniques provide greater design freedom to control/engineer the material response of the final panel, they also provide substantial environmental benefits. For example, by creating a more optimally designed textile, less total material may be required in the construction. Additionally, because each panel is made in an additive manner, there is comparatively little waste or off-cut material associated with the manufacturing as well.

While these engineered textiles may be utilized with any article of functional apparel, they may find particular utility within the field of footwear construction, as footwear design is a unique blend of form and function with numerous competing design considerations. More specifically, a shoe must be sufficiently stiff to provide proper containment, while being sufficiently flexible to allow the foot to naturally move and flex. In this context, by selecting and placing/orienting yarn strands with appropriate elasticities, the engineered textile may achieve specific and deliberate directional strengths at the lowest possible weight or fiber density.

The composite structures and engineered textiles of the present disclosure comprise a plurality of yarn strands that are bonded or otherwise interconnected by a bonding material. As used herein, the term "yarn" is understood to refer to a long or essentially continuous strand of fibers, or filament(s) in a form suitable for knitting, weaving, crocheting, braiding, or otherwise intertwining with other yarns or segments of the same yarn, or for use in sewing including embroidery. Types of yarns include continuous filament yarns, examples of which include monofilament yarns (consisting of a single continuous filament) and multi-filament yarns (consisting of a plurality of flat or textured filaments which are typically twisted or air-entangled with each other). Spun yarns are another type of yarn, which consist of a plurality of staple fibers (such as cotton or wool fibers) or cut fibers or filaments which are entangled with each other in the spinning process. Complex yarns are yet another type of yarn, which may consist of a cord or cabled yarn, or which may consist of two or more single yarn strands combined into a ply yarn. Natural fibers or filaments may be used, including naturally occurring cellulosic fibers such as cotton or flax, naturally-occurring protein-based fibers or filaments such as wool or silk, and naturally-occurring mineral-based materials such as asbestos. Man-made fibers or filaments may be used, including man-made fibers or filaments made from inorganic materials such as glass or metals, as well as fibers or filaments made from regenerated natural polymers, including cellulose-based polymers and protein-based polymers, man-made carbon fibers or filaments, and man-made fibers or filaments made from synthetic polymers. In many cases, the synthetic polymers are thermoplastics, including thermoplastic elastomers, although thermosets such as elastane may also be used. Synthetic polymers commonly used to make fibers or filaments include polyesters (such as polyethylene terephthalate (PET)), polyamides (such as Nylon-6, Nylon 6,6, and Nylon-11), polyolefins (such as propylene homopolymers and copolymers, as well as ethylene homopolymers and copolymers), and polyacetates (such as cellulose acetate fibers). Polyurethanes, such as thermoplastic polyurethanes, may also be used to make fibers or filaments. The strands may comprise or consist of yarn including natural fibers or filaments, man-made fibers or filaments, or a combination of both natural and man-made fibers or filaments, such as a spun yarn comprising a blend of cotton and polyester fibers. The strands may comprise or consist of a multi-filament yarn comprising polyester or polyamide filaments, such as a commercially available embroidery thread.

Generally, industrial knitting machines and other industrial-scale manufacturing processes require the use of yarns having a minimum tenacity of about 1.5 grams per denier. Tenacity refers to the amount of force needed to break a yarn divided by the linear mass density of the yarn, and is determined by subjecting a sample of the yarn to a known amount of force until the sample breaks, for example, using a strain gauge load cell. Lower tenacity yarns have tenacities ranging from about 2.5 to about 4 grams per denier, while medium tenacity yarns have tenacities ranging from about 5 to about 10 grams per denier. Yarns having tenacities greater than about 11 grams per denier are considered to be high tenacity yarns. High-tenacity yarns may include fibers or filaments comprising polymer such as aramids and ultra-high molecular weight polyethylene (UHMWPE). The yarns used in accordance with the present disclosure can be lower tenacity yarns, medium tenacity yarns, high tenacity yarns, or any combination thereof. In some examples, the strands may comprise or consist of a spun yarn, a mono-filament yarn, or a multi-filament yarn having a tenacity of at least 1.5 grams per denier, or of at least 2.5 grams per denier. In other examples, the strands may comprise or consist of a multi-filament yarn having a tenacity of at least 11 grams per denier.

The bonding material used to bond the yarn strands to each other is a polymeric material comprising one or more polymers. All of the polymers present in the bonding material (i.e., all of the one or more polymers) are referred to as the bonding material polymeric component. The bonding material may also include one or more optional non-polymeric ingredients, referred to as the bonding material non-polymeric component. Examples of non-polymeric ingredients include fillers, processing aids, anti-yellowing additives, plasticizers, pigments, and any combinations thereof. The bonding material may be a thermoplastic bonding material comprising one or more thermoplastic polymers. The bonding material may be an elastomeric bonding material comprising one or more elastomeric polymers. An elastomer may be defined as a material having an elongation at break greater than 100 percent, or greater than 200 percent, or greater than 400 percent, as determined using ASTM D-412-98 at 25 degrees Celsius. The elastomeric bonding material may have an elongation at break greater than 100 percent, or greater than 200 percent, or greater than 400 percent, as determined using ASTM D-412-98 at 25 degrees Celsius. The bonding material may be a thermoplastic elastomeric bonding material comprising one or more thermoplastic elastomers. At the point that the bonding material is applied to the yarn strands, it may be thermoplastic, and may remain thermoplastic after solidifying. In one example, prior to being applied to the yarn strands, the bonding material may comprise pre-polymers, such as two pre-polymers which react with each other in a polymerization reaction, and which cure into a solid bonding material (typically a thermoset solid bonding material) after being applied to the yarn strands. In another example, at the point the bonding material is applied to the yarn strands, it may be thermoplastic, and may solidify into a thermoset bonding material (e.g., if a crosslinking reaction is initiated during the printing or extruding step, or during the solidification step), or, after application and solidification, a solid thermoplastic bonding material may be crosslinked to form a thermoset bonding material (e.g., if a solid bonding material is crosslinked using electron beam radiation, or if a reactive solid bonding material is cured by exposure to heat or moisture). In such examples, the bonding material may further comprise a polymerization initiator or cross-linking agent when it is applied to the yarn strands.

The one or more polymers of the bonding material (i.e., the polymeric component of the bonding material) may comprise or consist essentially of one or more thermoplastic elastomer (TPE), including a TPE chosen from a thermoplastic polyurethane elastomer, a thermoplastic polyester elastomer, and a thermoplastic styrene-ethylene/butylene-styrene (SEBS) block copolymer elastomer. The one or more polymers of the bonding material may comprise or consist essentially of one or more crosslinked elastomers, such as polybutadiene or polyisoprene, or a polysilane or polysiloxane. The one or more polymers of the bonding material may comprise or consist essentially of a thermoplastic vulcanizate (TPV) including a crosslinked elastomer phase distributed in a continuous thermoplastic phase. The one or more polymers of the bonding material may comprise or consist essentially of a polymer chosen from a polyurethane, a polyurea, a polyester, a polyether, a vinyl polymer, a polyolefin, an acetate polymer, an acrylate or methacrylate polymer, a polystyrene, a polysilane, a polysiloxane, a polycarbonate, and any combination thereof, including homopolymers and copolymers thereof. The one or more polymers of the bonding material may comprise or consist essentially of a polyurethane, including a polyurethane chosen from an elastomeric polyurethane, a thermoplastic polyurethane (TPU), an elastomeric TPU, and combinations thereof. The thermoplastic elastomeric TPU may comprise or consist essentially of a polyurethane copolymer such as a polyester-polyurethane or a polyether-polyurethane or a combination thereof. The one or more polymers of the bonding material may comprise or consist essentially of polyurea. The one or more polymers of the bonding material may comprise or consist essentially of a polyamide homopolymer, or of a polyamide copolymer, including a polyether block polyamide (PEBA) copolymer. The one or more polymers of the bonding material may comprise or consist essentially of a vinyl copolymer such as ethylene-vinyl acetate (EVA) or ethylene-vinyl alcohol (EVOH). The one or more polymers of the bonding material may comprise or consist essentially of a polyolefin homopolymer or copolymer, such as a polypropylene or polyethylene homopolymer, or a copolymer of propylene or ethylene. The one or more polymers of the bonding material may comprise or consist essentially of a styrene copolymer such as poly(styrene-butadiene-styrene) (SBS), or a styrene-ethylene/butylene-styrene (SEBS) block copolymer. The polymer can comprise or consist essentially of one or more thermoplastic polymers selected from the group consisting of a polyester, a polyamide, a polyurethane, a polyolefin, homopolymers and copolymers of each, and combinations thereof.

While a single bonding material may be used as described herein, a first and a second bonding material may also be used. The first and second bonding materials may be used to bond different areas of a single set of yarn strands, or may be used to bond different layers of yarn strands, such as first and second layers of yarn strands. The polymeric component of the first and second bonding polymers may both comprise one or more shared polymers, such as, for example, one or more shared TPEs. The polymeric component of the first and second bonding materials may consist of the same polymers but in different proportions. The polymeric component of the first and second bonding materials may consist of the same polymers in the same proportions. The first and second bonding materials may differ from each other only in the type or concentration of pigments present.

Figure 2:
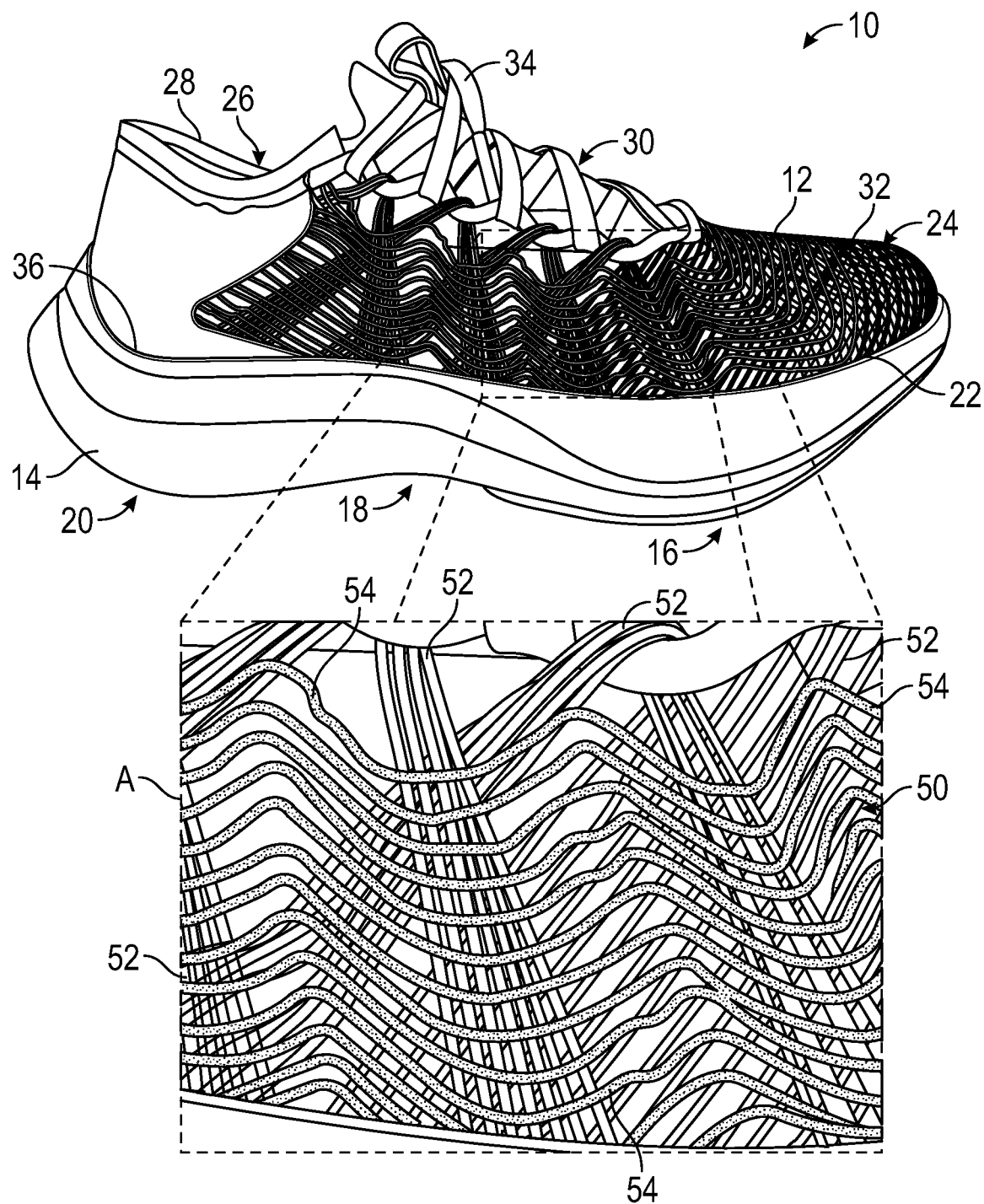
FIG. 2 schematically illustrates a side profile of an article of footwear having an upper that incorporates an embodiment of a polymer-bound nonwoven engineered textile.

Referring now to the drawings, wherein like reference numbers refer to like features throughout the several views, FIGS. 1 and 2 schematically illustrate two embodiments of an article of footwear 10 that utilizes engineered textiles in its construction. While the article of footwear is illustrated for discussion as an athletic shoe or "sneaker," it should be recognized that this is simply one example application of where the presently disclosed engineered textile may be used. In other applications, however, the present textiles may be incorporated into other aspects of this or other styles of footwear, and/or may be incorporated into any logically relevant article of functional apparel or other type of consumer product. As used herein, the terms "shoe" and "footwear", including permutations thereof, may be used interchangeably and synonymously to reference any suitable type of garment worn on a human foot. Lastly, features presented in the drawings are not necessarily to scale and are provided purely for instructional purposes. Thus, the specific and relative dimensions shown in the drawings are not to be construed as limiting.

The representative article of footwear 10 (also generically referred to as a shoe 10) is generally depicted in FIGS. 1-2 as a bipartite construction that is primarily composed of a foot-receiving upper 12 mounted on top of a subjacent sole structure 14. For ease of reference, the shoe 10 may be divided into three anatomical regions: a forefoot region 16, a midfoot region 18, and a hindfoot (heel) region 20. The shoe 10 may also be divided along a vertical plane into a lateral side 22—a distal half of the shoe 10 farthest from the sagittal plane of the human body—and a medial side 24—a proximal half of the shoe 10 closest to the sagittal plane of the human body. In accordance with recognized anatomical classification, the forefoot region 16 is located at the front of the shoe 10 and generally corresponds with the phalanges (toes), metatarsals, and any interconnecting joints thereof. The midfoot region 18 is located between the forefoot and heel regions 16 and 20 and generally corresponds with the cuneiform, navicular and cuboid bones (i.e., the arch area of the foot). The heel region 20, in contrast, is located at the rear of the shoe 10 and generally corresponds with the talus (ankle) and calcaneus (heel) bones. Both the lateral and medial segments 20, 22 of the article of footwear 10 extend through all three anatomical regions 16, 18, 20, and each corresponds to a respective transverse side of the shoe 10. While only a single shoe 10 for a right foot of a user is shown in FIGS. 1-2, a mirrored, substantially identical counterpart for a left foot of a user may be provided. Recognizably, the shape, size, material composition, and method of manufacture of the shoe 10 may be varied, singly or collectively, to accommodate practically any conventional or nonconventional footwear application.

With continued reference to FIGS. 1-2, the upper 12 is depicted as having a shell-like construction for encasing a human foot within an internal cavity 26. As illustrated, the upper 12 generally includes an ankle opening 28 that permits ingress of a wearer's foot into the internal cavity 26. In the embodiment shown in FIG. 2, a throat section 30 extends from the ankle opening 28 toward the forefoot region 16 and permits the upper to splay open to aid ingress/egress with the cavity 26. A vamp portion 32 is generally located forward of the throat section 30 and/or in a portion of the upper that covers the phalanges of the foot. With continued reference to FIG. 2, a closure 34 (e.g., shoelace, strap, buckle, or other commercially available mechanism) may extend laterally across the throat section 30 (i.e., in a medial-lateral direction) and may be utilized to modify the girth of the upper 12 to more securely retain the foot within the interior of the shoe 10 as well as to facilitate entry and removal of the foot from the upper 12.

The sole structure 14 is rigidly secured to the upper 12 such that the sole structure 14 extends between the upper 12 and a support surface upon which a user stands. In effect, the sole structure 14 functions as an intermediate support platform that separates and protects the underside of the user's foot from the ground. In addition to attenuating ground reaction forces and providing cushioning for the foot, the sole structure 14 may provide traction, impart stability, and help to limit various foot motions, such as inadvertent foot inversion and eversion. In some embodiments, the sole structure 14 may be attached to the upper 12, for example, via an adhesive or other typical joining means. When joined together and viewed from an external perspective, the line where the upper 12 meets the sole structure 14 may be referred to as the bite line 36.

In general, the purpose of the upper 12 is to achieve proper containment of the wearer's foot, to provide adequate lateral stability, and to permit certain foot flexures in a minimally restrictive manner. Said another way, the upper is tasked with maintaining the sole structure in a stable location relative to the wearer's foot (i.e., minimizing any relative translations) while providing lateral support to prevent the wearer's foot from rolling off the sole structure 14, and providing longitudinal elasticity to enable normal dorsiflexion foot motions throughout a typical gait. As will be discussed below, it has been found that these seemingly competing interests of stability and flexibility can be most efficiently addressed through the use of anisotropic fabrics with specifically engineered and directionally-dependent material properties.

In each of FIGS. 1-2, an inset graphic A is provided to better illustrate the construction of an engineered textile 50 that is used to form a portion of the upper 12. As will be discussed in greater detail below, one aspect of the present disclosure relates to a non-woven engineered textile 50 having one or more directionally dependent material properties. Such an engineered textile 50 may include a plurality of aligned and spaced yarn strands (generally at 52 in FIGS. 1-2) that are joined together with an overlaid bonding material 54 to form a composite engineered textile structure.

In this construction, while certain yarn strands 52 may overlap with other yarn strands throughout the textile panel, they are not interconnected with those overlapping yarn strands except through the bonding material 54. In many embodiments, the bonding material 54 may be deposited across the yarn strands 52 periodically such that for any given strand, there are portions or points that are uncovered by the bonding material 54 (i.e., the "unbonded portions") and other portions or points that are contacted by the bonding material 54 (i.e., the "bonded portions"). As generally shown the unbonded portions may alternate with the bonded portions along the length of any given yarn strand 52. In some configurations, such as shown in FIG. 2, the bonding material may follow a continuous bonding material trace path that overlaps or intersects with a plurality of yarn strands 52. Similarly, for any given yarn strand 52, a plurality of bonding material trace paths may overlay or cross the yarn strand 52 to form the plurality of bonded portions.

As further illustrated in FIGS. 1-2, the total collection of yarn strands 52 extending across the engineered textile 50 may include various subsets of constituent yarn strands, where within a given subset of yarn strands, the respective yarn strands 52 of that subset are aligned with each other (either in a parallel or substantially parallel manner, or else extending at angles to each other while originating from a common point).

Figure 3:
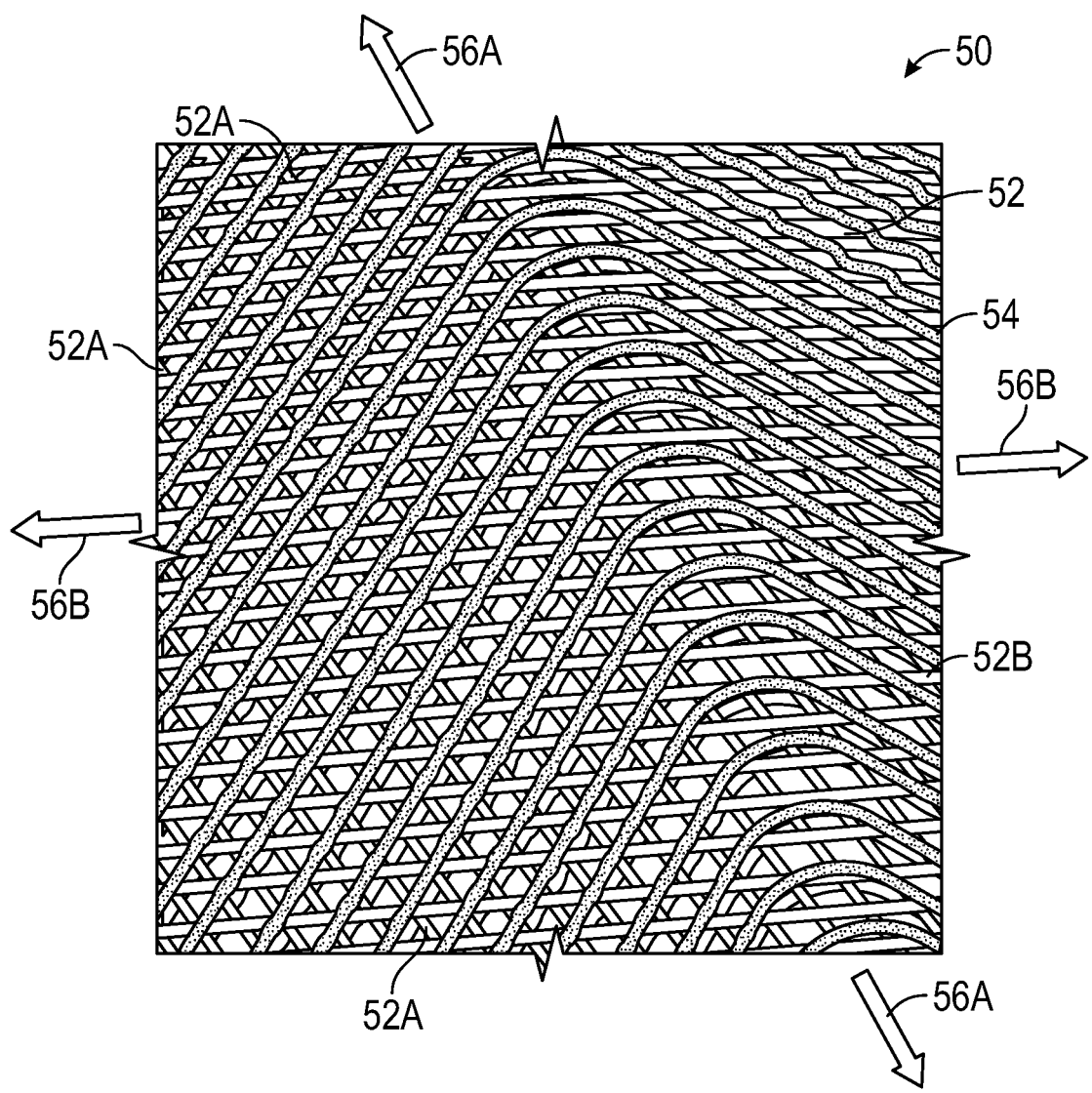
FIG. 3 schematically illustrates a polymer-bound nonwoven engineered textile configured to receive two obliquely angled tensile loads.

FIG. 3 schematically illustrates an embodiment of an engineered textile 50 that has been created with the intent of receiving to two differently oriented tensile loads 56A, 56B while minimizing the amount of load carried in sheer. To accomplish this intent, the yarn strands that form the fabric have been carefully oriented such that at least a portion of the yarn strands are parallel to each expected load 56A, 56B. More specifically, the engineered textile 50 has a first subset of yarn strands 52A oriented in parallel with the first expected tensile load 56A and has a second subset of yarn strands 52B oriented in parallel with the second expected tensile load 56B. As used herein, the orientation of a yarn strand may be defined by the longitudinal axis of the strand. Because the yarn strands are individually and/or collectively placed (e.g., via windings and/or layering), there is little restriction on the relative orientation and position of the strands within the engineered textile. For example, while FIG. 3 illustrates a bi-directional construction to accommodate two tensile loads, in other configurations, the engineered textile may include subsets of yarn strands extending parallel to three or four or five or even more different directions to receive as many differently oriented tensile loads. In many embodiments, the yarn strands 52 may intersect/overlap other yarn strands 52 (when viewed from a perspective normal to the surface of the fabric) at various angles, including oblique angles as shown (which is typically not possible with woven textiles). Further, material strength, elasticity, or yarn tenacity within each subset 52A, 52B may be independently selected based on the design objectives for the completed article/fabric and need not be uniform even across the textile.

Winding

Figure 4:
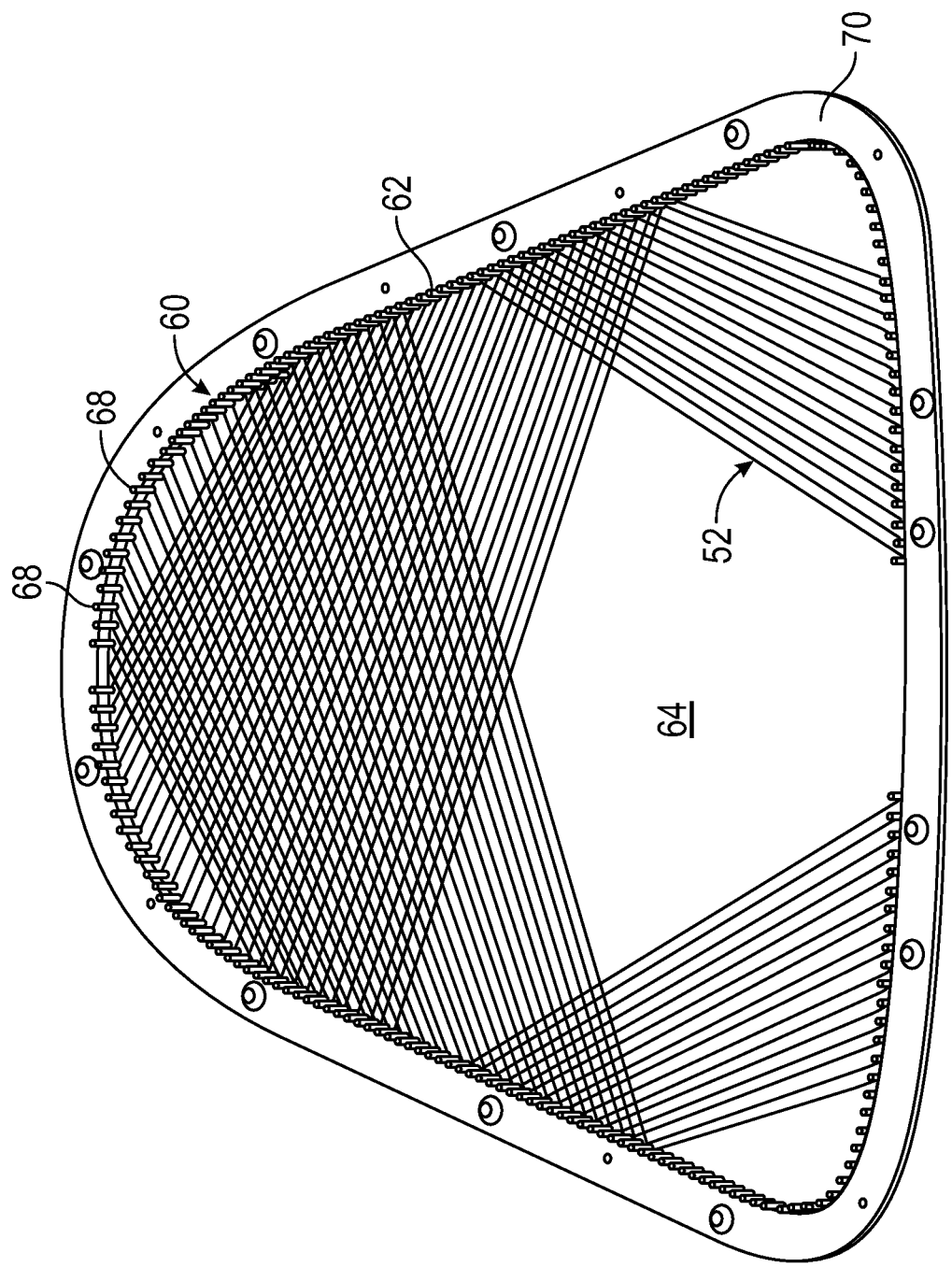
FIG. 4 schematically illustrates a pin-jig/fixture used to create a plurality of linearly extending yarn strands.

FIG. 4 generally illustrates a single layer 60 or subset of yarn strands 52 of an engineered textile 50 prior to the strands being secured together. In this illustrated embodiment, the yarn strands 52 may all be approximately coplanar, and each constituent strand may extend linearly between two points provided around the perimeter 62 of a workspace. In some embodiments, the workspace may be defined as the interior or central area 64 of a workpiece frame (i.e., a "jig 70") that has a plurality of retention features 68 (pins, hooks, teeth) provided along the outer perimeter 62 or at other locations within the workspace. In the illustrated embodiment, the jig 70 is a pin jig, where the retention features 68 are upstanding pins (also referred to via reference numeral 68) that generally extend orthogonal to, or even marginally pitched away from the central area 64 of the jig 70. In other embodiments, the jig may be a tooth-jig that has a plurality of teeth extending outward (in plane) from the central area 64. When creating the yarn strands 52, one or more continuous lengths of yarn may be wrapped or wound around the retention features 68 and across the central area of the jig 70. In doing so, some or all of the yarn strands may be integral to each other during the winding process. For clarity, as used herein, a "yarn strand" is a discrete linear segment of yarn that extends across at least a portion of the workspace or central area 64 of the jig 70 and between two opposite retention features. Due to the wining process, multiple yarn strands may be integral with each other as segments or portions of a single continuous length of yarn.

FIGS. 5-8 schematically illustrate one embodiment of a system 80 for automatically winding one or more continuous lengths of yarn 82 around a plurality of retention features 68/pins provided on a jig 70 to form a plurality of yarn strands 52. As generally shown, the system 80 utilizes a movable winding guide or head 84 (best shown in FIGS. 6-8) to controllably direct the yarn 82 across the central area of the jig and around the upstanding pins 68. To more precisely control the placement of the yarn 82, the winding head 84 may include one or more guide tubes 86 through which the yarn 82 may pass. The guide tubes 86 may be fixedly or movably joined to the head 84 and may extend into the plane of the workspace during operation. The yarn 82 may be supplied via a bobbin or spool 88 (shown in FIG. 5) and may be tensioned via a suitable tensioning device. In some embodiments, the tensioning device may comprise a brake or clamp that restricts the rate at which the yarn may be supplied through the winding head 84. In other embodiments, the tensioning device may be a spring or other torque control device that may act on the spool to control or resist the unspooling of the yarn from spool 88. The tensioning device may operate actively or passively and may act either directly on the yarn or on the spool 88. Examples of active tensioners may include one or more electronically controlled clamps, brakes, or automatic feeders that may controllably resist or controllably supply the feed of the yarn to/through the head 84. Conversely, passive tensioners may lack any ability for direct control, but instead may include one or more friction elements (grommets, mechanical contacts, and the like) that simply resist the unconstrained unspooling or passage of yarn through the winding head 84.

In some embodiments, the tensioning device may be operative to control the residual tension or strain in each yarn strand as the continuous length of yarn is wound around the retention features 68. In some embodiments, a first plurality of yarn strands may be drawn across the workspace such that they maintain a first amount of wound strain/tension while a second plurality of yarn strands may be drawn across the workspace such that they maintain a second amount of sound strain/tension that is different than the first amount of strain/tension. In other embodiments, each yarn strand may be wound with a similar amount of strain/tension, however, a modulus of a first plurality of yarn strands may be different than a modulus of a second plurality of yarn strands. In this manner, some strands may be more elastically stretched during the winding process, and once removed from the jig 70, may be inclined to revert to a less stretched state. In an engineered textile utilizing this multi-modulus/varying strain yarn structure, once removed from the jig, the yarn strands with more strain may contract (e.g., coil or wave) the strands with less strain. In this manner, once stretched in the final article, the strands with the greater modulus may serve as a lock-out structure that may provide a piecewise-smooth stress/strain response. Said another way, within the final article, the lower modulus strands may be allowed to stretch a predetermined amount before the higher modulus strands become taught and engage to stiffen or "lock-out" the fabric from further stretch (i.e., or greatly reduce the rate at which it is capable of stretching).

The winding head 84 may be moved throughout the central area 64 of the jig 70 in at least two dimensions via a suitable movement mechanism 90. The movement mechanism 90 may include one or more servomotors, linear and rotational transducers, pneumatic actuators, hydraulic actuators, or any other type of logically applicable actuation mechanism. In one embodiment, the movement mechanism 90 may be embodied, for example, as a carriage 92 that is controllably movable in two dimensions on a suitable support track 94 or gantry. In other embodiments, the movement mechanism 90 may comprise a multi-degree of freedom robotic arm and/or a workpiece manipulator to operatively control the winding of the yarn around a 3-dimensional body (e.g., a last).

Figure 5:
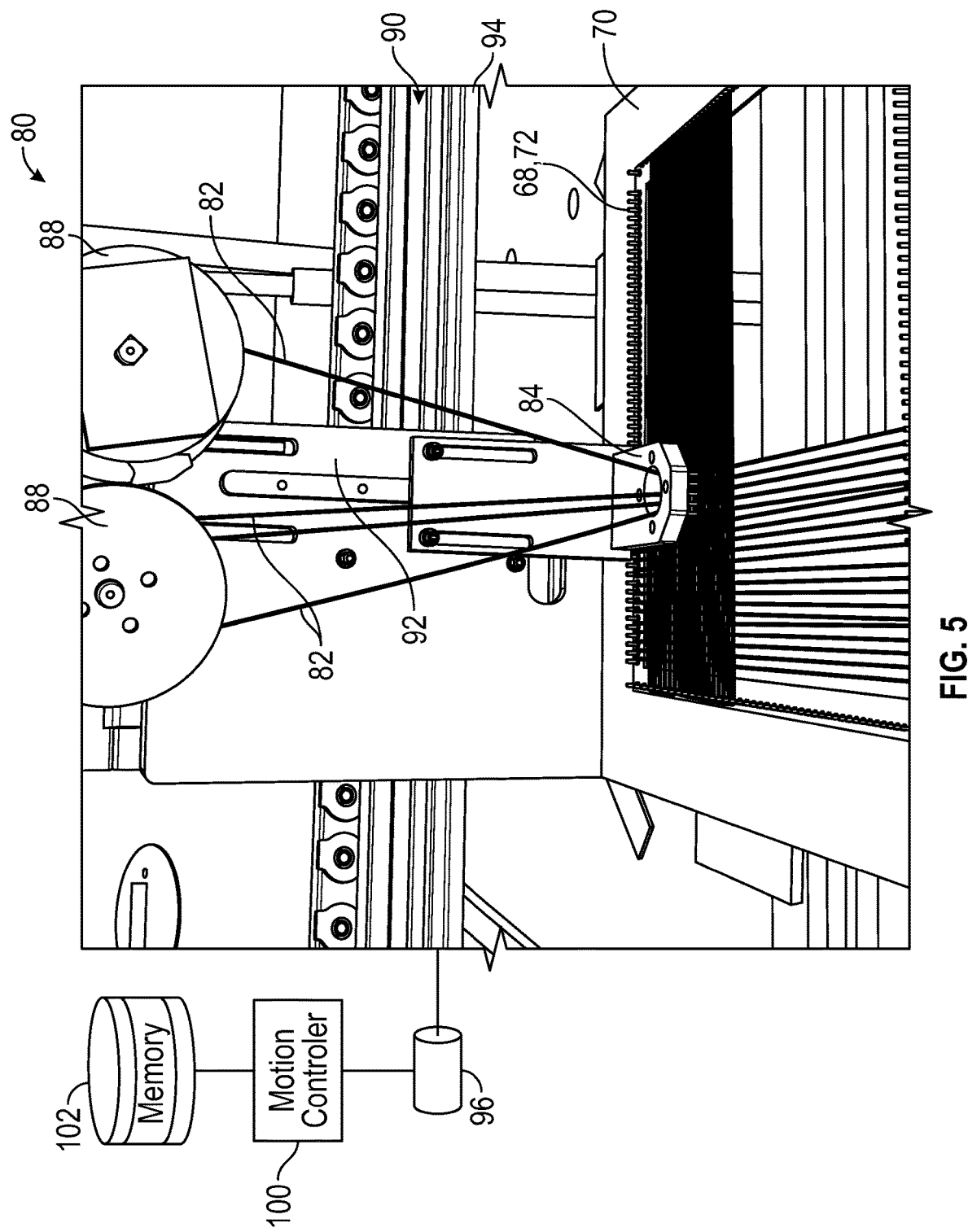
FIG. 5 schematically illustrates an embodiment of an automated winding machine for creating a plurality of yarn strands on a pin-jig such as shown in FIG. 4.

With continued reference to FIG. 5, the movement mechanism 90 used to control the positioning of the winding head 84 throughout the workspace/central area 64 may operate at the direction of a suitable motion controller 100. The motion controller 100 may include any required power electronic circuitry, control circuitry, processing capabilities, and processor-executable code that may be required to operatively control the motion of the winding head 84 via the one or more actuators 96 included with the movement mechanism 90. The motion controller 100 may further include logic circuits, Application Specific Integrated Circuit(s) (ASIC), electronic circuit(s), central processing unit(s) (e.g., microprocessor(s)), input/output circuit(s) and devices, appropriate signal conditioning and buffer circuitry, and other components to provide the described functionality, etc. The motion controller 100 may be in communication with an associated memory 102 and storage (e.g., read only, programmable read only, random access, hard drive, tangible, etc.), whether resident, remote or a combination of both, that is operative to store processor-executable software, firmware programs, modules, routines, used to direct the operation of the movement mechanism 90 when executed by the motion controller 100.

Figure 6:
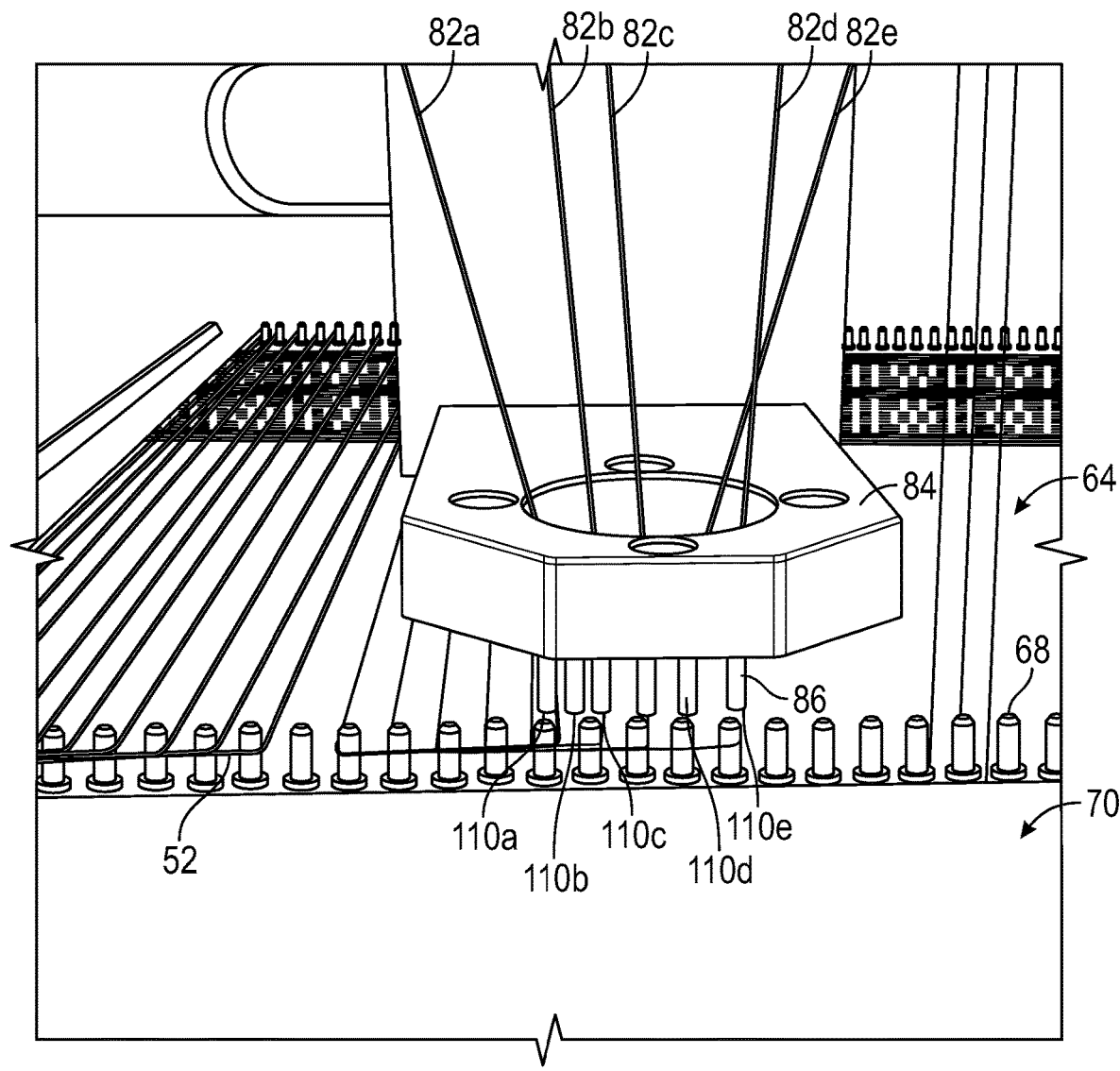
FIG. 6 schematically illustrates a winding head for use with the system of FIG. 5.
Figure 7:
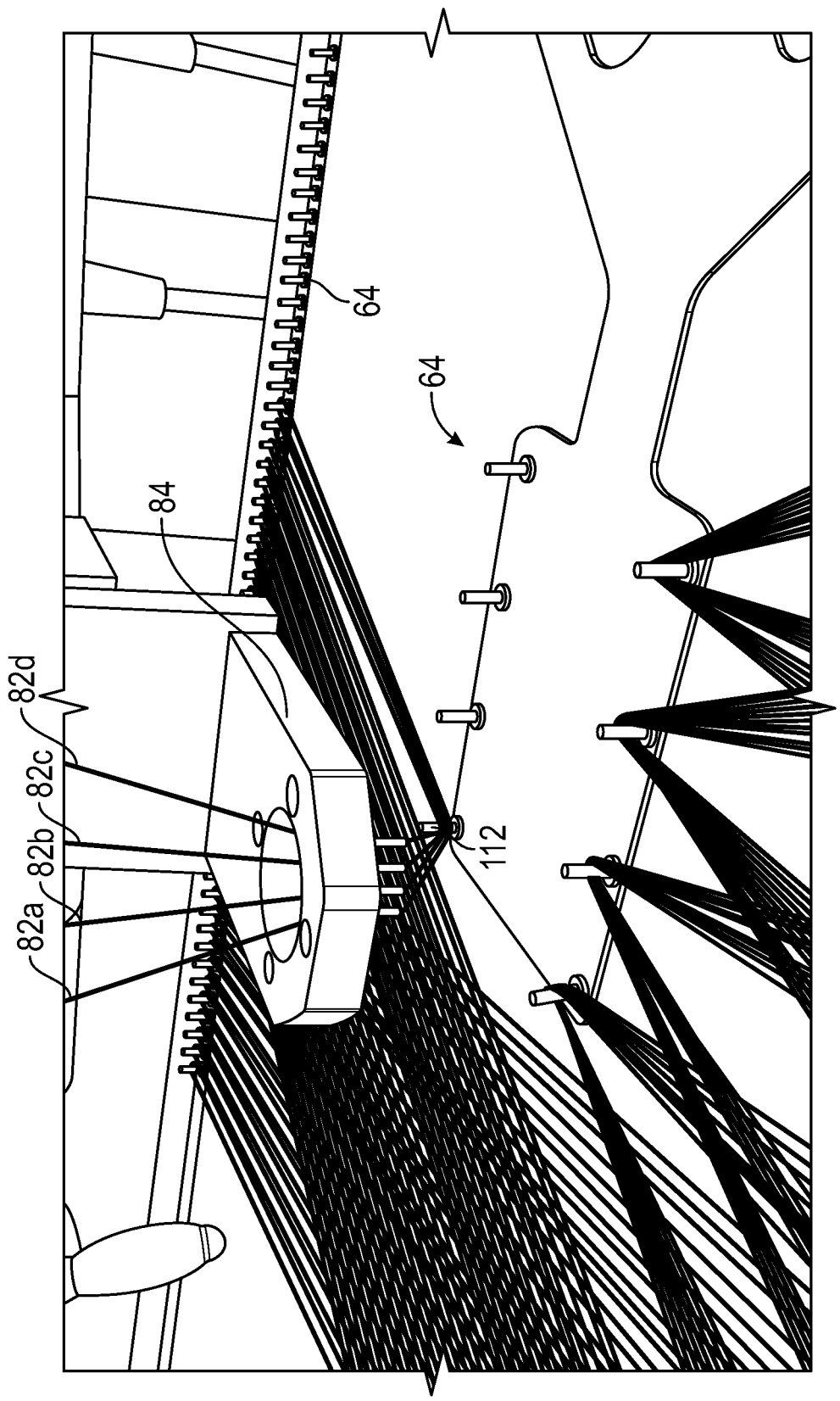
FIG. 7 schematically illustrates an embodiment of an automated winding machine for creating a plurality of yarn strands on a pin-jig such as shown in FIG. 4.
Figure 8:
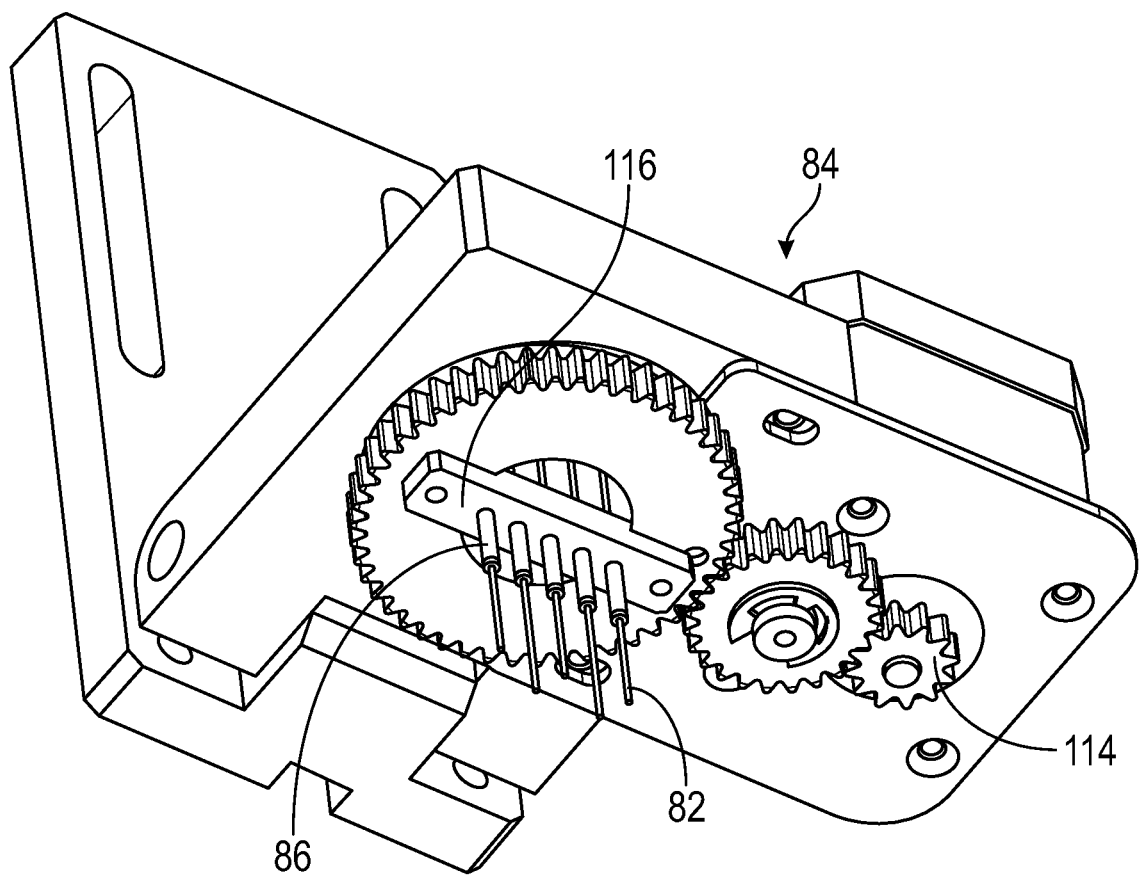
FIG. 8 schematically illustrates a bottom perspective view of a winding head with a rotatable array of guide tubes.

FIGS. 6-8 better illustrate embodiments of a winding head 84 that may simultaneously draw multiple separate yarn strands 52 across the workspace/central area 64. As may be appreciated, winding multiple strands at once may increase the overall winding speed and efficiency, which may allow for a greater production throughput and lower associated energy usage. Multi-strand winding can further enable unique visual appearances, such as by using a plurality of different colors within the array. Similarly, multiple strands, each having a different color or elasticity may be fed through a single to provide a unique appearance. As shown in FIG. 6, in some configurations, the winding head may simultaneously draw each of a plurality of yarns (82a, 82b, 82c, 82d, 82e) around a different respective one of a plurality of upstanding pins (110a, 110b, 110c, 110d, 110e). As generally shown in FIG. 7, for some applications the winding head 84 may alternatively draw each of a plurality of yarns (82a, 82b, 82c, 82d) from a different respective retention member along the perimeter of the jig 70 to/around a single upstanding pin 112 provided in a central portion of the jig 70. By winding multiple yarns around a single pin 112, the system may, for example, create a dynamic eyelet or attachment point that may be in structural communication with multiple points along the perimeter and across a broader area of the textile.

In some embodiments, such as schematically shown in FIG. 8, the winding head 84 may include a rotatable drive 114 that is operative to alter the collective alignment of the plurality of guide tubes 86 on the winding head 84 and/or within the workspace 64. Such a drive 114 may include, for example, a stepper motor that is controllable to rotate a gear-mounted guide tube array 116. In some embodiments, the rotatable drive 114 may enable the array of guide tubes to meet the peripheral retention members/pins at a predefined angle (e.g., a different absolute orientation of the guide tubes may be achieved when wrapping around pins in the forefoot/anterior toe end, as compared with pins on the lateral sidewall). By varying the orientation of the guide tube array relative to the collective orientation of the pins that are being circumnavigated, the presented relative spacing of the guide tubes could be varied to achieve a closer yarn strand spacing.

Figure 9:
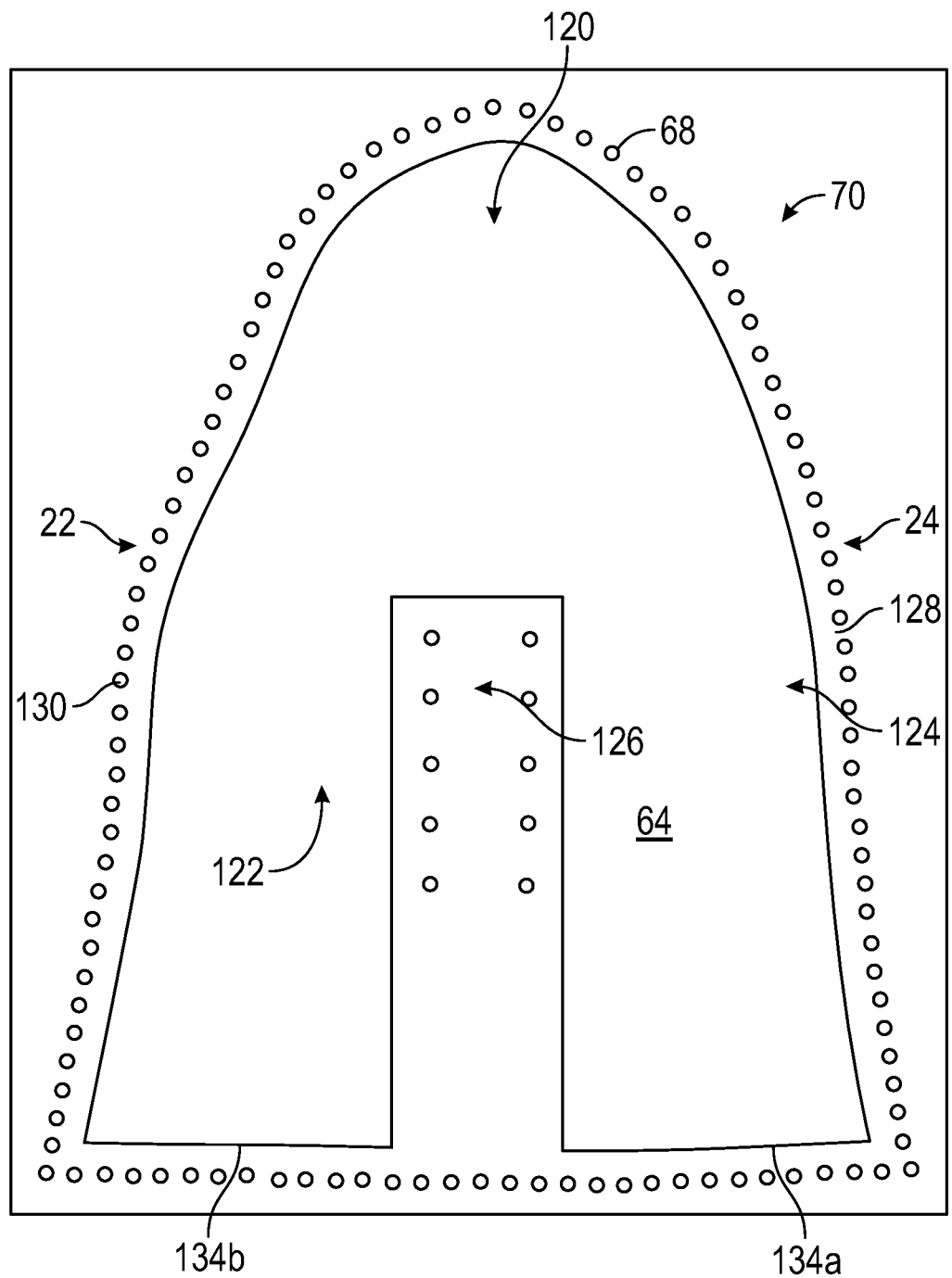
FIG. 9 schematically illustrates an embodiment of a pin-jig for creating an engineered textile to form an upper of an article of footwear.

While FIGS. 5-7 generally illustrate yarn strands being formed across square/rectangular pin jig, material waste can be further reduced by designing the jig and/or pin location to approximate the final shape of the textile component such as shown in FIG. 9. As shown, the jig 70 in FIG. 9 may be used to produce a substantially flat/planar finished yarn structure and/or engineered textile that may combine with other components to form a three-dimensional shoe upper similar to the upper illustrated in FIG. 2. As generally illustrated in FIG. 9, in some embodiments, a central area 64 of the jig 70 may have a first portion 120 corresponding to a vamp of the completed upper 12, a second portion 122 corresponding to a medial sidewall of the completed upper 12, and a third portion 124 corresponding to a lateral sidewall of the completed upper 12. The second and third portions 122, 124 may be separated by a centrally located throat region 126 that corresponds to and/or may form the throat of the article of footwear. The jig 70 includes a plurality of upstanding pins 68 that are spaced at regular intervals and arranged along a curvilinear path encircling the central area 64. The jig 70 may generally include a lateral side 22 and medial side 24 with the pins 68 on the lateral side 22 defining a lateral peripheral edge 128 of the jig 70 and the pins 68 on the medial side 24 defining a medial peripheral edge 130 of the jig 70. Further, the jig 70 may include rear edge portions 134a, 134b corresponding to both lateral and medial heel seams.

As appreciated in the art, an upper created via the jig 70 in FIG. 9 would likely be stretched or wrapped around a three-dimensional solid model of a foot (called a "last"). The lateral and medial peripheral edges 128, 130 would then likely be seamed or otherwise attached to a piece of material called a strobel, which is intended to extend between the wearer's foot and the sole structure 14. The lateral and medial heel seams 134a, 134b would be affixed together to form a seam extending between the sole structure 14 and the ankle opening 28 on the far posterior portion of the heel region 20.

Figure 18A:
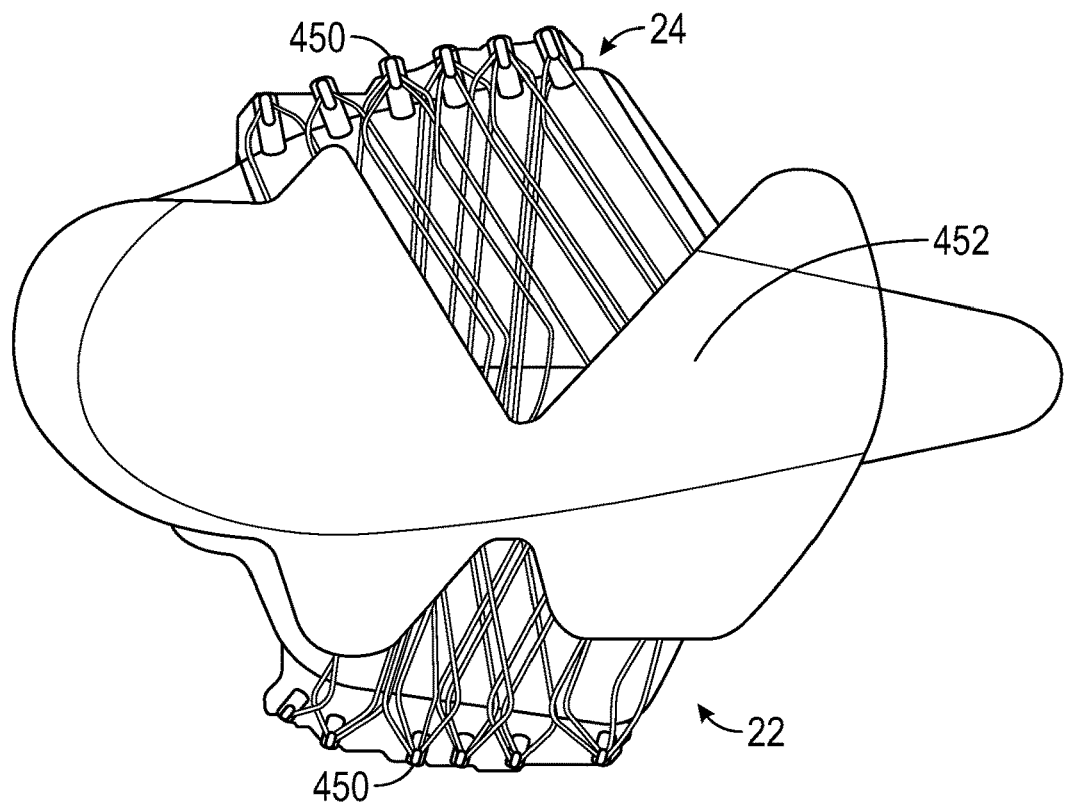
FIG. 18A is a schematic plan view of component of an upper having a plurality of yarn strands extending across an underfoot region.
Figure 18B:
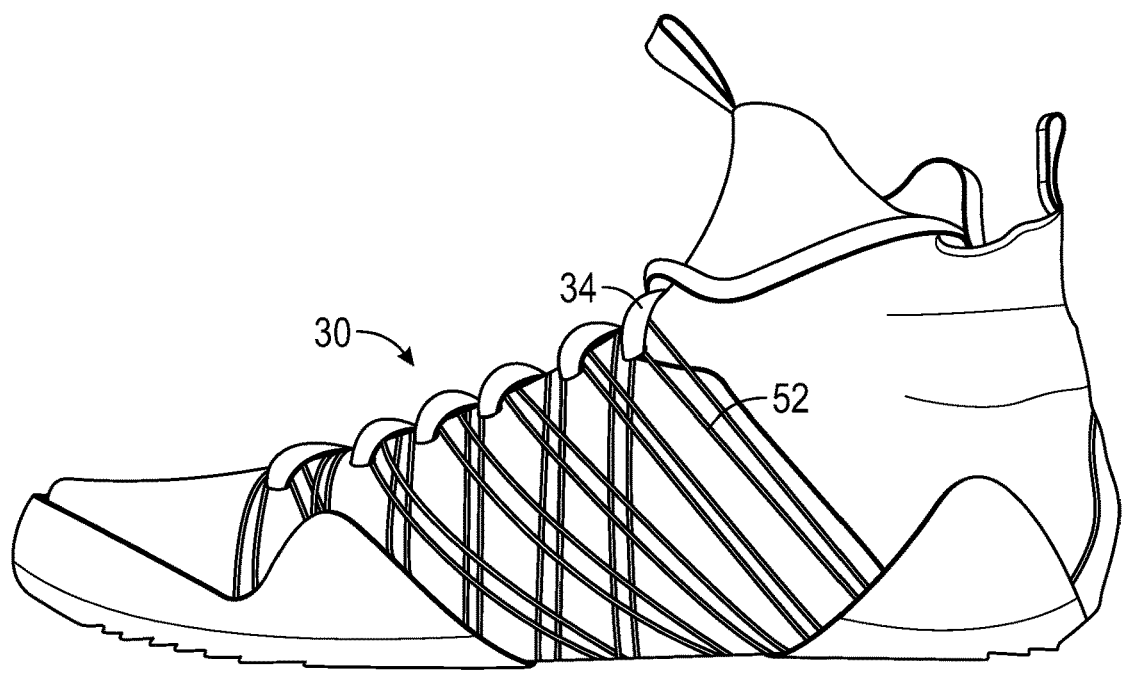
FIG. 18B is a schematic side view of an article of footwear formed in part from the upper component of FIG. 18A.

While the present techniques will generally be discussed with respect to a jig design similar to what is shown in FIG. 9, these teachings and techniques may be equally applicable to jigs of other shapes or geometries. For example, in some embodiments, the jig may create an upper component that extends beneath the foot (i.e., between the internal volume and the sole structure) and that wraps upward to opposing medial and lateral sides of the foot, such as shown in FIGS. 18A-18B. Similarly, in non-footwear contexts, the jig may be designed to form a component panel or portion of an article of functional apparel or a wearable accessory.

Figure 10:
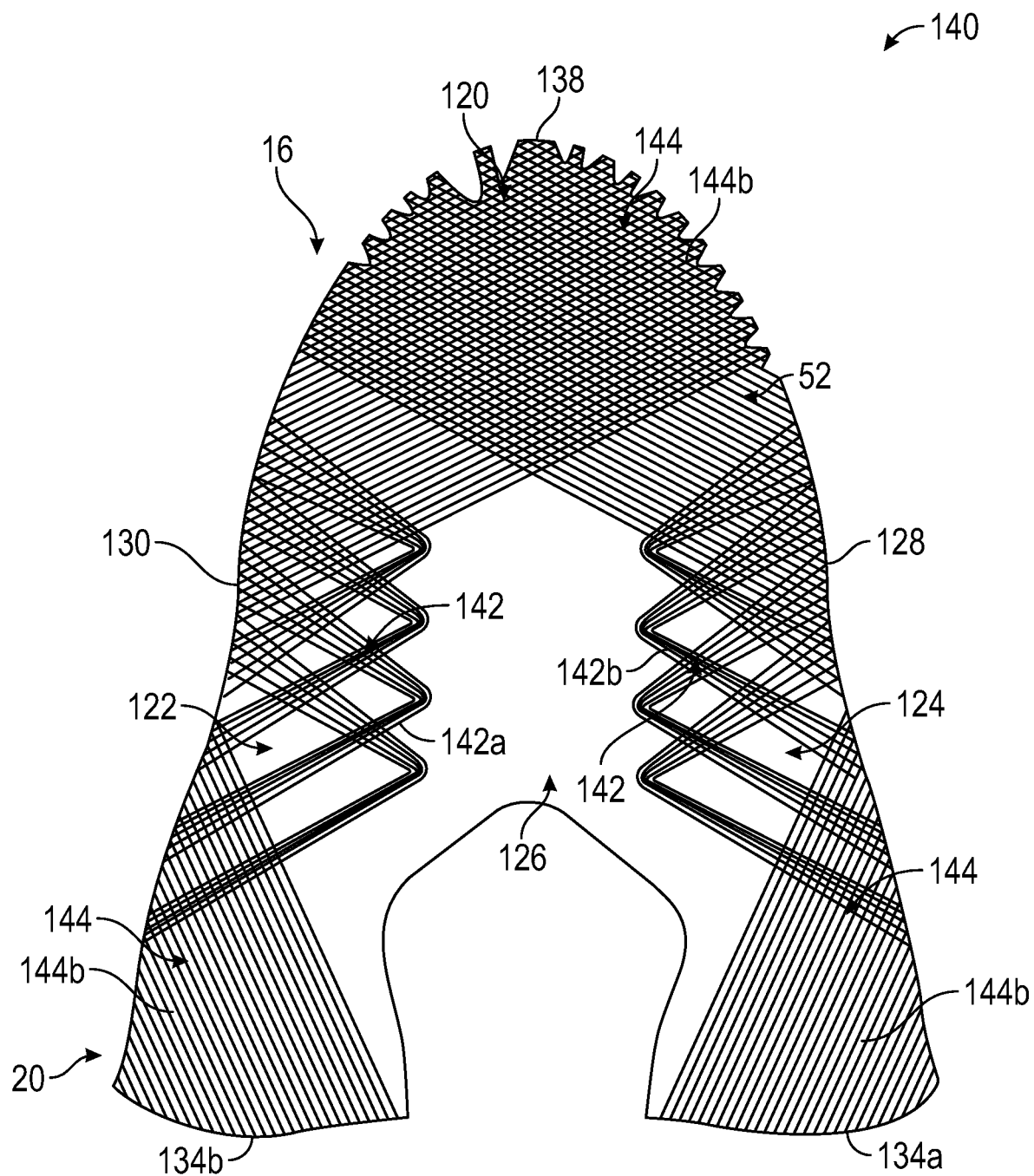
FIG. 10 schematically illustrates an embodiment of yarn strand windings that may be formed on a pin-jig similar to that illustrated in FIG. 9

FIG. 10 schematically illustrates one embodiment of a yarn strand configuration/design 140 that may be produced on a jig 70 such as shown in FIG. 9. In this embodiment, a plurality of yarn strands 52 each extend linearly across a central area 64 of a jig 70. The collection of yarn strands 52 may generally be divided into two types or subsets: a first subset 142 including yarn strands that terminate at or extend from the throat region 126; and a second subset 144 including yarn strands that extend between points provided on the outer peripheral edge (i.e., between points on one or more of the heel seam 134a, 134b, the lateral and medial peripheral edges 128, 130, or an anterior toe edge 138).

The first subset 142 of yarn strands may be operative to provide sidewall support and/or to directly receive a tensile load from the closure 34. To accomplish this, each yarn strand in the first subset (generally at 142) may extend from the throat region 126 across at least one of the second portion 122 (e.g., yarn strands 142a extending across the medial sidewall) or third portion 124 (e.g., yarn strands 142b extending across the lateral sidewall) of the jig. In some embodiments, these yarn strands may terminate at one of the lateral or medial peripheral edges 128, 130. In some embodiments, the first subset 142 of yarn strands 52 may define or encircle one or more eyelets through which a shoelace may pass.

The second subset 144 of yarn strands may be operative to provide more general support and structure the to the upper 12 including in one or both of the heel region 20 or forefoot region 16 of the upper 12. In this subset 144, each yarn strand may extend between two points along the outer peripheral edge of the jig without terminating at the throat region 126. As generally illustrated in FIG. 10, this subset may include yarn strands 144a that extend linearly from the lateral peripheral edge 128 to the medial peripheral edge 130 across the vamp portion 120 and/or yarn strands 144b that extend from a heel seam 134a, 134b to one of the lateral or medial peripheral edge 128, 130.

Figure 11:
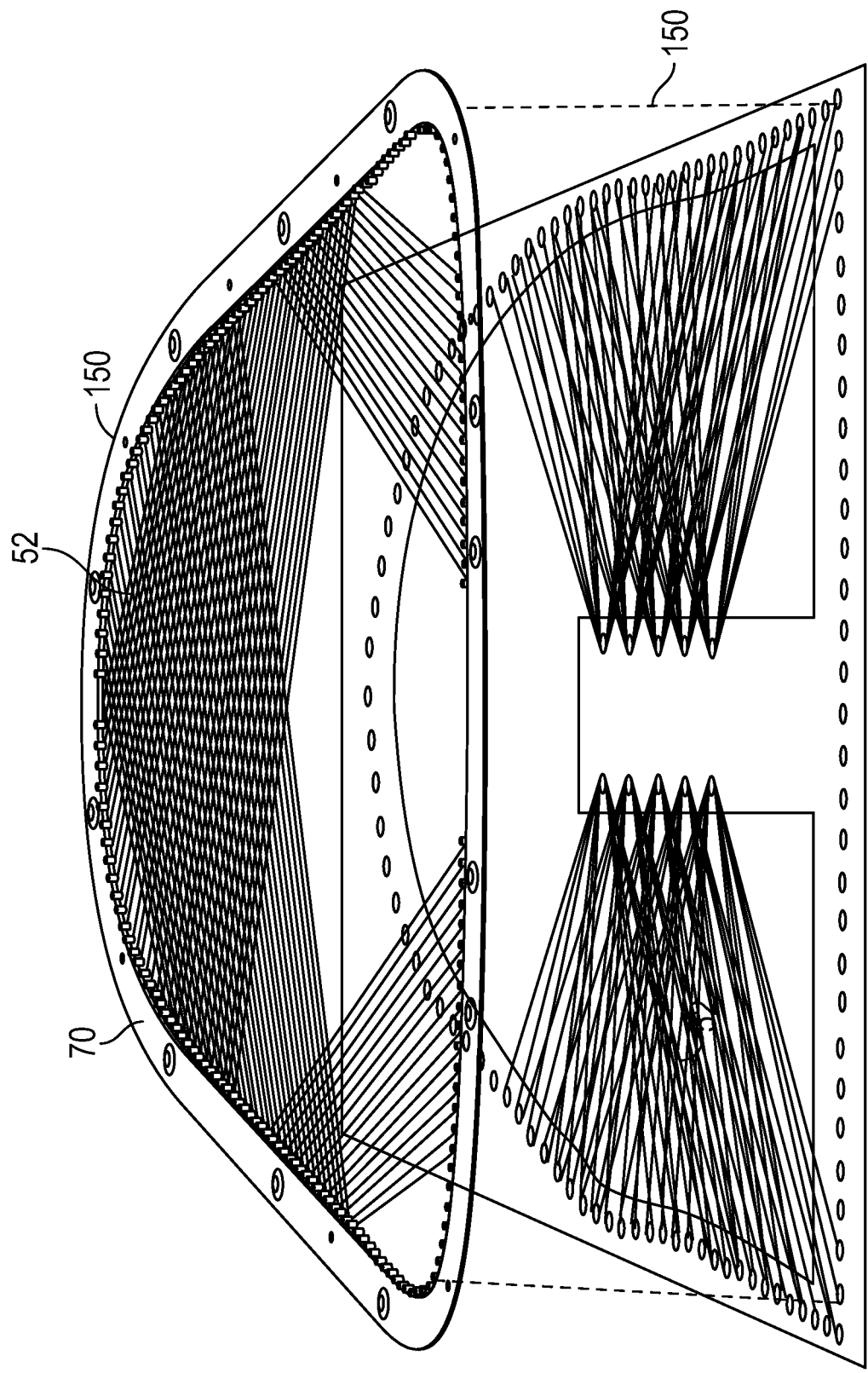
FIG. 11 is a schematic exploded view of a stack of pin-jigs used to form a multi-layered engineered fabric.

Referring to FIG. 11, in some embodiments, an engineered textile and/or overall yarn structure may be constructed from a plurality of different layers 150 of yarn strands 52, with each layer being separately wound or otherwise formed. In some embodiments, each layer may be wound on its own respective jig 70 and the collection may be stacked and joined to each other to form an engineered textile. The jigs 70 may be designed, sized, or otherwise configured so that when stacked, each layer 150 of yarn strands may be brought into contact with a directly adjacent layer. Further, the jigs may include one or more locating features that, when stacked, ensure proper alignment and registration between the layers. In some embodiments, each yarn layer may be planar or substantially planar. Stacking a plurality of yarn layers, potentially with bonding material disposed in between adjacent layers may provide a z-height stackup and create a thickness to the engineered textile that is greater than a similar thickness of any one layer. While FIG. 11 illustrates the stacking of two yarn layers, in some embodiments other materials may be layered between or on top of a portion of the yarn strands to further build the composite structure. As will be discussed more below, this concept of layering may enable other materials such as vinyl, suede, foam, felt, mesh, or the like to be integrated into or joined with the engineered textile to form a larger component with the engineered textile only comprising a portion of the component.

With continued reference to FIG. 11, the mechanical properties of the completed engineered textile may be influenced by the orientation, spacing, tenacity, and elasticity of the yarn strands in each constituent layer. Said another way, it is expressly contemplated that different layers may be formed from strands having differing elasticities and/or yarn spacing/density to provide different material stretch responses according to how the force is applied. This may enable the engineered textile to be resilient in one direction and elastic in another (i.e., with those two directions not necessarily being perpendicular to each other as might be the case with a traditionally woven fabric).

Polymer Joining

As noted above, unlike traditional manners of fabric construction such as weaving, knitting, crocheting, or braiding, the yarn strands in the present engineered textile do not need to physically entangle, intertwine, weave, knot, loop, or otherwise directly interconnect with other yarn strands in the textile to provide structure. Therefore, absent some manner of joining adjacent yarn strands together, once the yarn is removed from the jig, the respective yarn strands may devolve into a chaotic spaghetti-like mess of yarn that retains little or no qualities of a useful fabric or textile. To create this interconnecting structure, a bonding material 54 may contact and/or extend between adjacent ones of the plurality of yarn strands 52 to bind the respective strands 52 together, such as generally illustrated in FIGS. 1-3, referenced above. While this disclosure should not preclude the presence of certain yarn strands being twisted, looped, braided, or knotted in localized areas, such interconnections would not on their own be substantial enough to provide the material integrity required from a textile.

Figure 12:
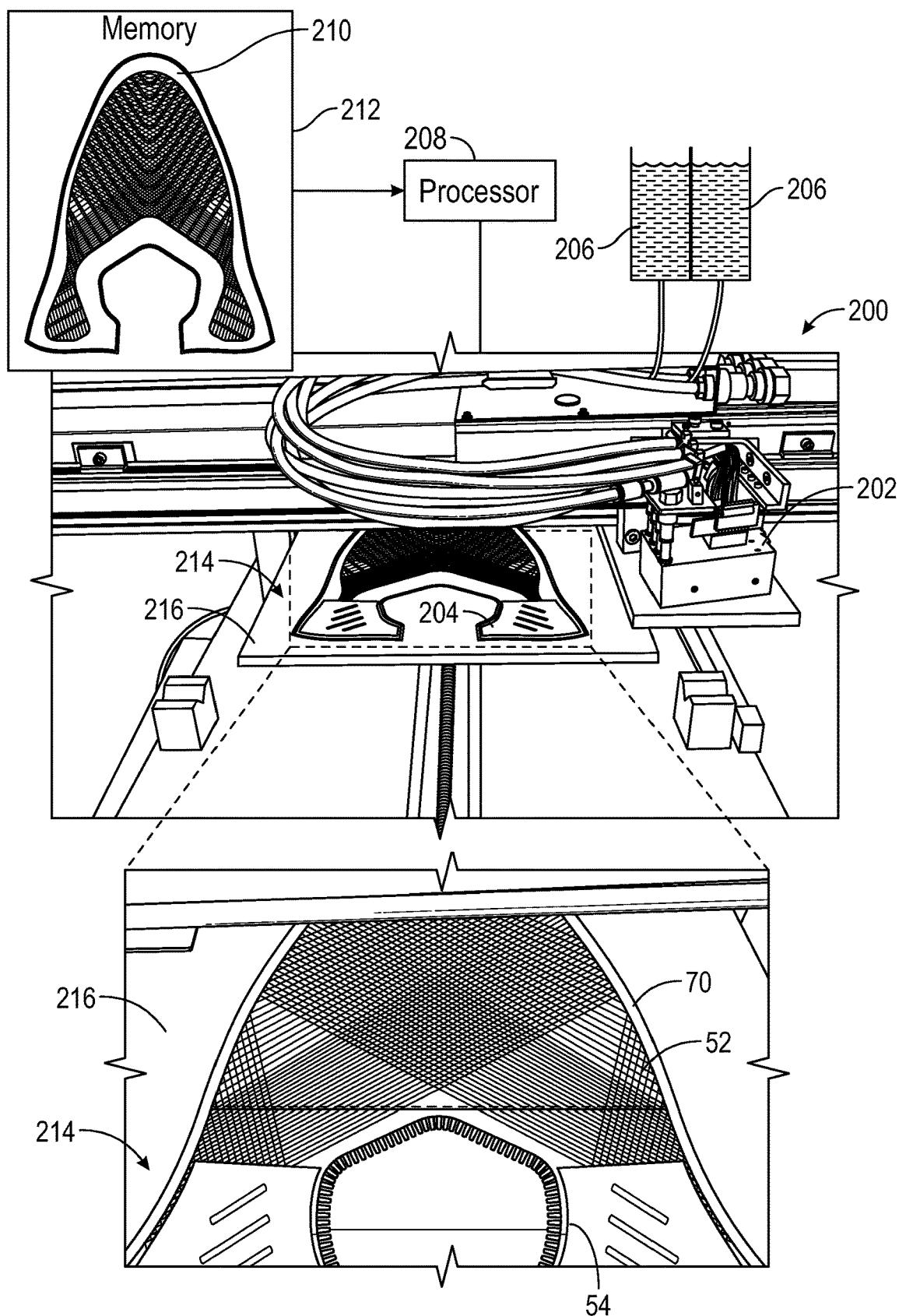
FIG. 12 is a schematic illustration of a system for printing a polymer onto a plurality of yarn strands.
Figure 14:
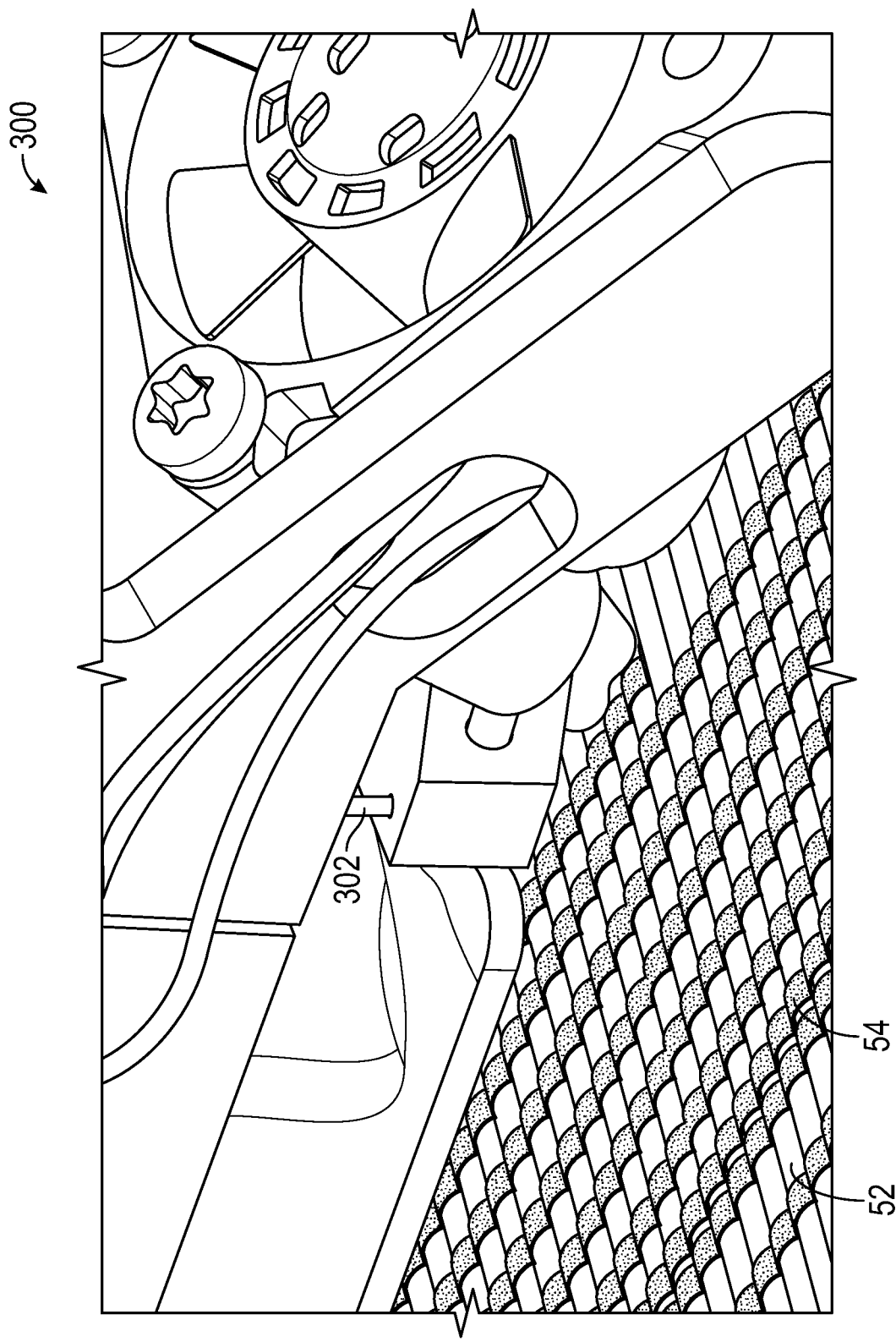
FIG. 14 is a schematic perspective view of a deposition modeling system applying a flowable polymer across a plurality of yarn strands.
Figure 15:
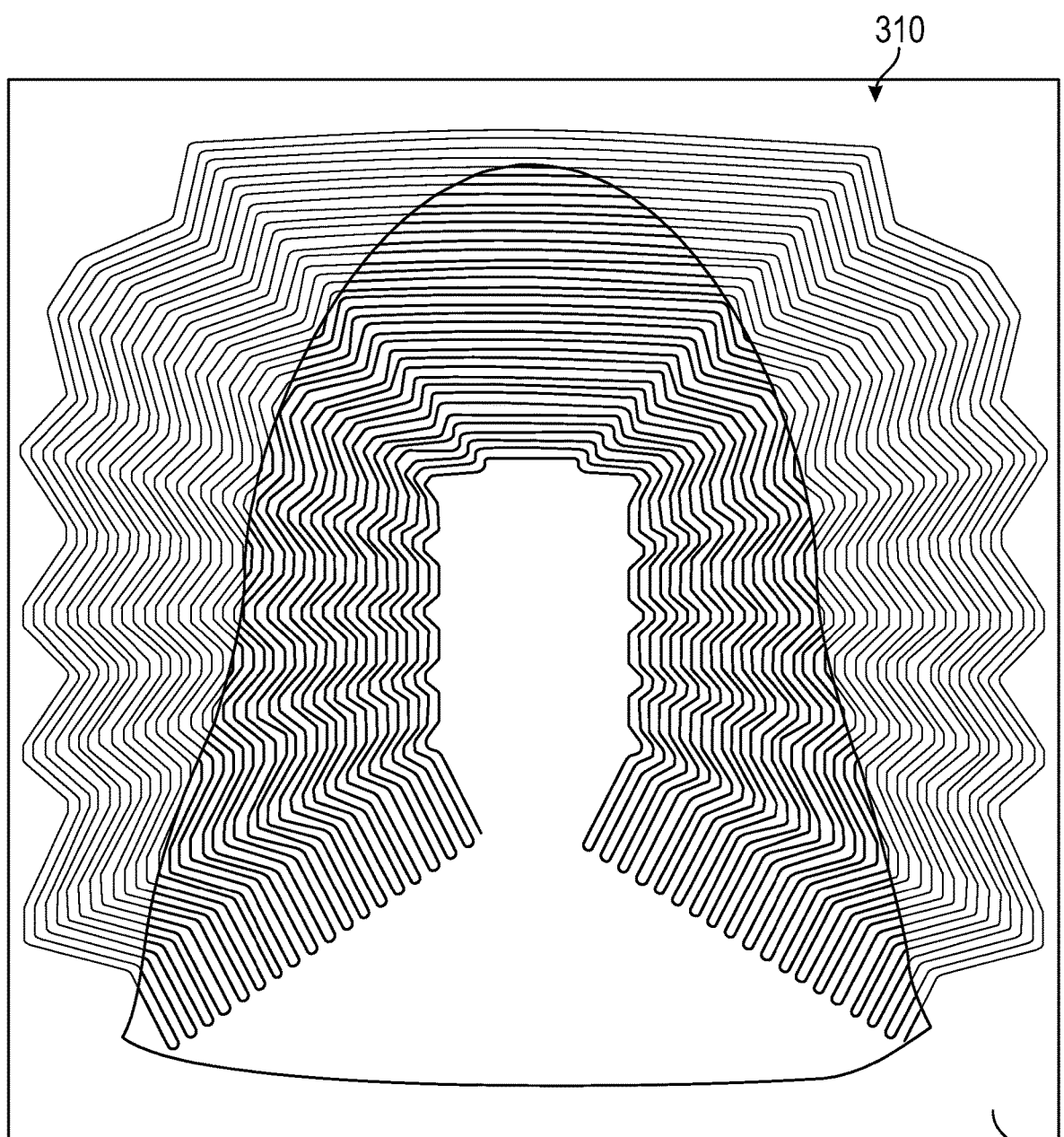
FIG. 15 is a schematic illustration of vector-based path that may be utilized to direct a deposition modeling print head to apply a flowable polymer.

The bonding material 54 may be applied to the yarn strands 52 using a variety of different techniques. In many embodiments, the bonding material 54 may be printed, extruded, or otherwise deposited onto the yarn strands while in a physical state that is suitable for such processes. Examples of printing processes may include screen-printing processes; bitmap-based printing/material deposition processes (e.g., as may be used with an inkjet printer such as shown in FIG. 12), or vector-based three-dimensional printing processes/deposition modeling (e.g., fused filament fabrication such as shown in FIGS. 14-15). In other configurations, the yarn strands 52 may be joined through the use of one or more preformed polymeric appliqués that are fused with the strands 52 through a suitable fusing process (e.g., heat staking, welding, or otherwise chemically bonding).

The application of the bonding material 54 to the yarn strands 52 may be a selective and additive process that results in each yarn strand being secured at a plurality of bonded points/portions along its length. These bonded portions may then be separated by respective and alternating unbonded portions where the yarn strand is substantially exposed. The total amount of bonding material applied to the yarn strands may be expressed as an areal fraction or percentage (bonding material coverage percent), whereby such a percentage may be represented according to the formula: [(bonding material coverage area/total textile area)], with the respective areas being measured in a two-dimensional plan view (i.e., a view parallel to the thinnest dimension of the engineered textile). In some embodiments, the bonding material coverage percentage may be between about 5% and about 95%, or between about 5% and about 50%, or between about 50% and about 95%, or between about 15% and about 35%. In some embodiments, the bonding material coverage percentage may vary across the engineered textile. For example, in a shoe context with the upper formed from the engineered textile, portions of the heel and/or forefoot areas (e.g., the heel counter and/or the toe box) may have a bonding material coverage percentage of between about 75% and 95%, whereas portions of the midfoot area (e.g., the medial or lateral sidewalls) or vamp may have a bonding material coverage percentage of between about 10% and about 70% or between about 10% and about 50%. In some embodiments, the bonding material coverage percentage may be altered via secondary processes after the application of the bonding material to the yarn strands. For example, in one configuration, the bonding material may be selectively heated and/or pressed to cause the bonding material to spread across a greater area (thus resulting in a greater coverage percentage).

When constructing the fabric, a wide variety of bonding materials may be used to secure the yarn strands together. A key importance, however, is that, following the joining, the fabric retains some degree of pliability and elasticity, and does not simply respond like a fiber reinforced composite (e.g., a traditional stiff carbon fiber composite). As such, if harder/less elastic bonding materials are used, they should be used in a lower quantity or at greater spacing to permit the interstitial yarn strands to react or flex without excessive restriction. If softer bonding materials are used to join the yarn strands, then the bonding material may be capable of covering larger contiguous areas while still permitting some level of fabric flex. In most instances, it may be preferable for the bonding material 54 to have a hardness, measured on the Shore A scale, of between about 10A and about 70A. Similarly, in some embodiments, the bonding material may have a material elasticity of between about 5% and about 400% or between about 100% and about 400%, or between about 200% and about 400% when in its finished/solidified form. In some designs, different bonding materials, having differing material hardnesses and/or material elasticities, may be used in different portions of the textile/upper to further tune the response characteristics of the final textile/article.

As generally illustrated in FIG. 12, in one embodiment, the bonding material 54 may be selectively applied to the yarn strands 52 using an ink-jet-style printing process. This process may employ a printing device 200 (i.e., ink-jet printer 200) that uses a movable print head 202 to selectively dispense a liquid or flowable bonding material 204 onto the yarn strands 56. In one configuration, the liquid bonding material 204 may comprise an uncured thermosetting polymer with sufficient material viscosity to span small spaces or gaps between the yarn strands. In some embodiments, the inkjet printer 200 may include at least two fluid reservoirs 206, one containing a resin and the other a hardener/polymerizing agent, where the two components may be mixed prior to being expelled from the print head 202.

With continued reference to FIG. 12, the inkjet printer 200 may operate at the direction of a processor or computer 208, which may control the print head to output the bonding material across the yarn strands in a pattern dictated by a digital bitmap 210 that is stored in memory 212 that is accessible by the processor 208. The bitmap may define a pixelized graphic or other design, where each pixel is coded to represent whether or not that pixel receives polymer. The inkjet printer 200 is then configured to expel the bonding material onto the yarn strands to recreate the graphic represented by the bitmap.

The inkjet printer 200 may further include a worktable 214 that is adapted to receive the jig 70 and collection of wound yarn strands. In some embodiments, the worktable 214 may be capable of linear motion to controllably advance the strands relative to the path of the print head. The worktable 214 may include a substrate surface 216, upon which the yarn strands 52 may rest, and which serves as a backstop to prevent the uncured polymer 204 from dripping out from between the yarn strands one applied. In a preferred embodiment, the worktable 214/substrate surface 216 may be formed from or coated with a dissimilar polymer from that being applied by the print head so that any adherence between the two is minimized (i.e., recognizing that polymers of similar chemical structure structures exhibit a greater bonding affinity)

Figure 13:
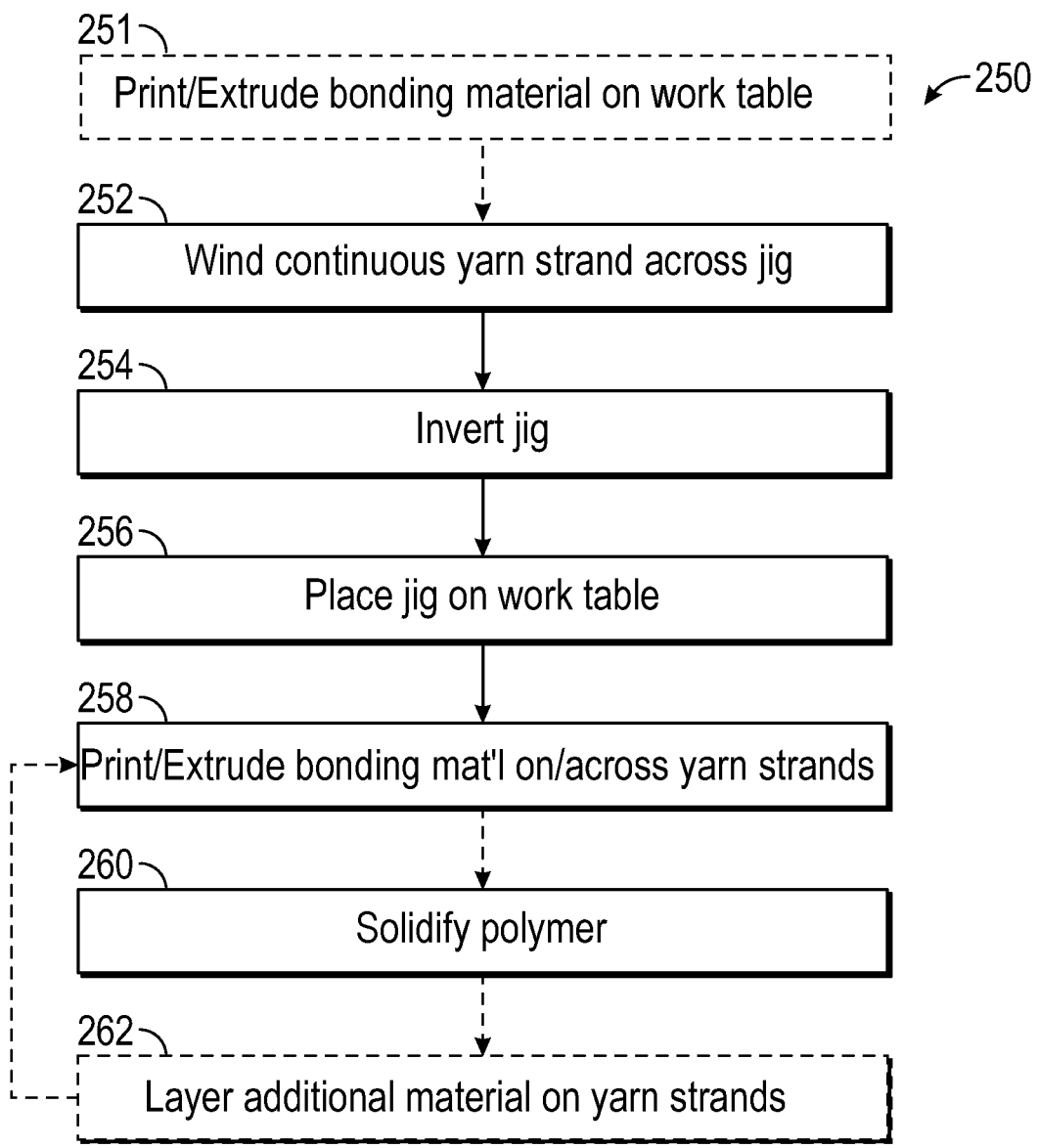
FIG. 13 is a schematic flow diagram of a method of forming an engineered textile.

FIG. 13 schematically illustrates one method 250 of constructing an engineered textile using the inkjet printer 200 such as shown in FIG. 11. As generally illustrated, the process may begin at 252 by providing a yarn-wound jig that includes a plurality of oriented yarn strands extending and aligned across a central region of a jig. While in some embodiments, this yarn-wound jib may be created via a process such as described above, where one or more continuous strands of yarn are wound around a plurality of retention features extending upward from a perimeter frame of the jig. In other embodiments, such wound jigs may be provided, for example, by acquiring them in a substantially complete/wound form from a third-party supplier.

Once the yarn-wound jig is provided (e.g., wound via an automated winding process), the entire jig may be inverted (at 254) so that the upstanding pins are facing downward. While this step may seem inconsequential at first, inverting the jig to make the pins extend downward permits relatively conventional print heads to print much closer to the margin of the jig without the risk of the print head contacting the pins. Inverting the jig on the worktable has further served to reduce the amount of material waste that would otherwise need to be trimmed off if the pins remained upstanding yet spaced further apart to permit free travel of the print head. In alternative designs, physical interference between the print head and upstanding pins may be corrected or reduced by designing the print head with an elongate nozzle and/or by enabling the print head to camber at the periphery of the workspace.

Once inverted, the jig 70 may be placed on or around the worktable/substrate surface (at 256) such that the retention features extend into and/or below the substrate surface (i.e., they may extend into holes/channels provided in the substrate, or else may be located radially outward of an outer periphery of the worktable). In some embodiments, the jig and/or worktable may include one or more registration pins or other interlocking features that, when the jig is placed on the worktable, may mechanically ensure that the jig is positioned at a known and repeatable location and orientation relative to the table.

Once the yarn strands are in place on the substrate, the processor may direct the print head to print or extrude the bonding material across the plurality of oriented yarn strands in a predefined pattern (at 258). In some embodiments, this step of printing or extruding the bonding material in a predefined pattern may also serve as a precursor step (at 251) to placing the yarn-wound jig on the worktable/substrate. In that manner, the process may be a print-place-reprint type process where the two layers of bonding material traverse similar predefined paths thus to fully encircle each yarn strand (i.e., as opposed to only printing on a single side.

Once applied to/across the yarn strands, the bonding material is then solidified at 260. In examples where the bonding material is a thermoplastic material prior to being printed or extruded and will remain a thermoplastic material in the finished article, solidifying the bonding material may comprise reducing its temperature to a temperature below its softening temperature, such as by actively or passively cooling the material. The bonding material may comprise a polymerizable composition comprising polymer precursors, and the step of printing or extruding the bonding material may include exposing the polymerizable composition to conditions under which the polymer precursors react to form polymers, which then solidify. The bonding material may comprise a crosslinkable polymer material, and the step of printing or extruding the uncured bonding material may comprise initiating the crosslinking agent, thereby curing and solidify the bonding material. The bonding material may comprise a crosslinkable material, and the step of solidifying the uncured bonding material may comprise exposing the printed or extruded uncured bonding material to actinic radiation in order to initiate crosslinking of the polymers, thereby curing and solidify the bonding material. For example, the uncured bonding material may be cured (or the curing may be initiated and/or accelerated) through the application of external radiation (at 260). For example, the uncured bonding material may be exposed to a form of actinic radiation, such as infrared light, ultraviolet light, or the like. In one configuration, the assembly may be heated to a predetermined temperature and held at that temperature for a predetermined amount of time. In some configurations, the curing may be a two or more-step process that involves first heating to a first predetermined temperature for a first predetermined amount of time, followed by heating to a second predetermined temperature, greater than the first temperature, for a second predetermined amount of time. In this configuration, the first temperature/time may serve to partially cure the polymer, whereas the second temperature/time may serve to fully cure the polymer.

In some configurations, multiple layers of materials or yarn strands may be combined into a final fabric assembly using the applied bonding material to adhere and bond adjacent layers or materials together. For example, in one embodiment, prior to finally solidifying the bonding material, a foam or woven fabric trim may be applied to an edge of the engineered textile and bound to the yarn strands via the applied bonding material. In the embodiment illustrated in FIG. 2, such a trim piece may include the fabric trim around the ankle opening, or the structurally reinforced heel counter. Similarly, in some embodiments, such as shown in FIG. 10, multiple layers of yarn strands may be stacked and joined to create a more dimensioned thickness and structure to the final textile.

In such a multi-layered configuration, once the bonding material applied to the initial layer of yarn strands is at least partially solidified (if necessary for the particular layup), the second (or subsequent) layer of yarn strands may be laid upon the assembly (at 262). The yarn strands within this newly added strand layer may be secured to each other through a subsequent application of the bonding material (at 258) across a plurality of yarn strands in the new layer. This process may repeat until all intended layers are stacked with bonding material spanning across each yarn strand in each layer, after which the entire assembly may be finally cured/solidified.

While FIG. 12 schematically illustrates an inkjet-style printer used to selectively apply the bonding material to the yarn strands, in other embodiments, different techniques may be utilized to apply the bonding material. For example, as shown in FIG. 14, a deposition modeling (DM) system 300 may be configured to selectively deposit a bead or strip of flowable thermoplastic material onto the yarn strands. Such a print system may include computer-controlled movable print head 302 that is controllably movable relative to the jig in at least two dimensions of translation. When compared to the inkjet-style printer, the DM printer 300 may be more capable of printing on a curved surface (e.g., a collection of windings wrapped around a shoe last), as it may be more easily mounted to a robotic arm.

As another difference, in some configurations, the inkjet printer may selectively deposit an uncured thermosetting polymer that must subsequently crosslink/cure to achieve a firm state. DM printers, however, typically heat and expel flowable thermoplastic polymers that become firmer once they cool below their respective glass transition temperature. Because of the nature of the extrusion process, DM printers tend to print in a continuous output, which is more suitable to path/vector based printing. As such, in the present configuration, the print head 302 of the DM printer 300 may be configured to traverse a predetermined path 310, such as schematically illustrated in FIG. 15 while expelling bonding material onto and between the yarn strands.

FIG. 14 schematically illustrates the DM construction of the upper shown in FIG. 2. As illustrated, one or more yarn strands 52 may be formed on a jig to create a yarn strand configuration/design 140 in the manners described above. A vector path design 310 may then be digitally constructed as one or more continuous paths upon which the print head of the DM printer would be instructed to deposit thermoplastic resin. Upon completion, the upper may resemble that shown at 312, and in FIG. 2.

Polymer-Fiber Interaction

While these bonding material printing techniques present a unique ways of binding constituent yarn strands within a fabric together, additional consideration may need to be given to the specific interaction between the applied bonding material and the yarn strands. More specifically, the present techniques for bonding adjacent yarn strands and layers allow great flexibility in controlling both the mechanical and material interaction between the bonding material and yarn strands. As used herein, mechanical bonding is intended to refer to any bonding or structural joining that is a direct result of physical entrapment of the fiber. Examples of mechanical bonding may include the bonding material partially or fully encircling the yarn strand, the bonding material interlocking with a surface texture of the strand itself (e.g., bonding material extending into depressions between constituent strands in a woven fiber), and/or the bonding material being mechanically blocked from contacting a portion of the fiber. Compared with mechanical bonding, material bonding is intended to refer to any bonding that is a direct result of the materials themselves. Such bonding may include covalent surface bonding, thermal fusing, and the like.

In general, mechanical bonding may primarily serve to constrain the yarn strand against translation in a radial direction (i.e., transverse to the longitudinal axis of the fiber), whereas material bonding may primarily serve to constrain the yarn strand from translation in a longitudinal direction.

In the process described above, by printing the bonding material on the yarn strands only after the strands are positioned on the substrate, there is a chance that the bonding material may not fully encircle the strand, and thus the mechanical bonding may not be as strong as possible. While not fully encircling the yarn strand may still provide a reasonably strong bond and may be suitable for some applications or low stress regions of the fabric, in other embodiments or locations it may be desirable to achieve a stronger and/or more durable bond by fully encircling the circumference of the yarn strand with the bonding material.

Various techniques may be employed to promote full entrapment of the fiber by the bonding material. For example, in one configuration, the fiber may be treated with a wicking promoter and/or may be held off the substrate by a predetermined distance to encourage the bonding material to migrate around to the reverse side of the fiber.

Figure 16:
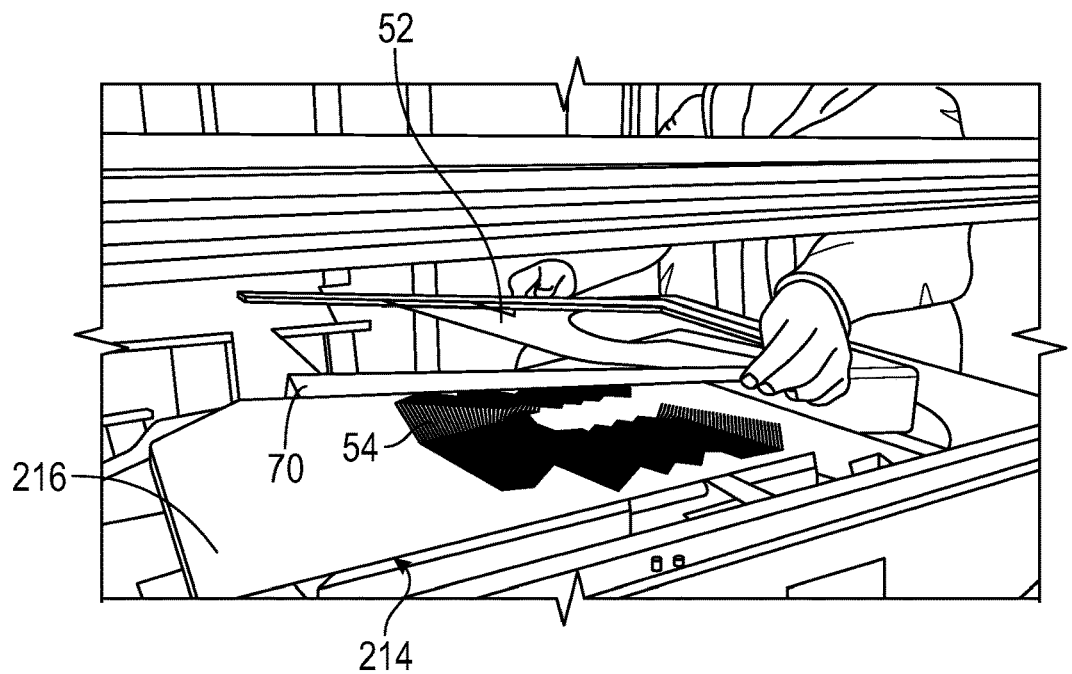
FIG. 16 is a schematic illustration of a polymer printed on a substrate prior to being overlaid with a wound yarn strand jig.

In another embodiment, full entrapment may be created via the printing process itself. As schematically illustrated in FIG. 16, one such technique may involve selectively printing the bonding material 54 to the substrate prior to laying the plurality of oriented yarn strands 54 across the upper substrate surface 216 of the worktable 214 (i.e., step 251 in FIG. 13). An identical or similar pattern of bonding material may then be printed over top of the strands 54 (step 258 in FIG. 13), which may at least partially flow through and contact the initially printed bonding material. This may remove any uncertainty as to whether the bonding material adequately flows to the reverse side of the strand. Once cured or solidified the different bonding material layers may fuse to each other to both encircle and span between each yarn strand. As an additional benefit, by printing directly to the substrate, the surface finish/texture/pattern of the outermost layer of bonding material 54 may be controlled via the surface finish of the substrate 216. More specifically, the worktable 214 may be etched, machined, or otherwise formed with a negative relief pattern in the substrate surface. When the bonding material is initially applied to this surface, it may flow across the pattern and take on this texture or form.

To further control the bonding material-strand interaction, it may be possible to intentionally control the degree or extent of chemical bonding between the materials. For example, by intentionally controlling the material composition of the bonding material and strand, adhesion may be promoted or alternatively impeded. For example, in one configuration, the strand may incorporate one or more polymeric yarn strands or coatings that are compatible with, or identical to the bonding material printed across the strand. When applied, the applied bonding material may bond with and/or thermally fuse with the polymer embedded into the strand to form a strong bond.

In another embodiment, the strand may be formed from or may otherwise be coated with a polymer that is dissimilar or not compatible with the printed bonding material. In doing so, while the printed bonding material may fully encircle the strand to capture it and constrain its transverse translation, it may not end up directly bonding to the strand itself. This may enable the strand to still longitudinally translate through the printed polymer, which may increase the fluidity and dynamic response of the fabric.

In still another embodiment, the vertical height of the print head may be varied as the print head moves across a yarn strand. By varying the vertical height as the bonding material is being expelled, the expelled bonding material may begin solidifying prior to fully contacting the yarn strand. In doing so, the bond between the bonding material and the yarn strand may be weakened, which may permit some ability for the yarn strand to break free or otherwise longitudinally travel through the "hole" that is formed via the z-height modulation.

Figure 17:
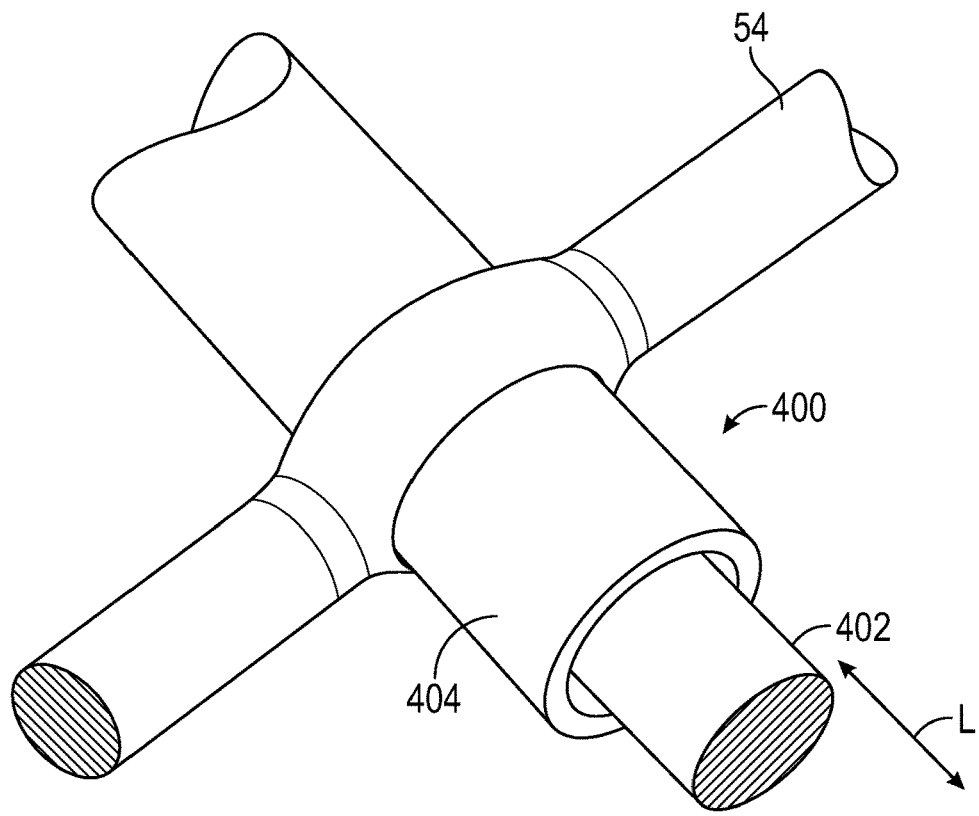
FIG. 17 is a schematic illustration of a multi-layer yarn strand entrapped by an applied polymer and having a longitudinally translatable core.

Referring to FIG. 17, in one embodiment, this longitudinal translation/tunneling concept may be taken a step further by utilizing a multi-layered yarn strand 400. As shown, the strand may comprise an inner core 402 that is surrounded by an outer sheath 404. The outer sheath 404 may be formed to include one or more constituent polymeric yarn strands or coatings that readily bond with the printed bonding material 54. By virtue of its construction, however, the sheath 404 may mechanically shield the core 402 from such bonding. As such, the inner core 402 may remain free to translate in a longitudinal direction L within the bonded and constrained outer sheath 404. In some embodiments, to ensure that no bonding occurs between the core 402 and the sheath 404, or between the core 402 and any bleed-through printed bonding material 54, the core 402 may be formed from a material that is dissimilar from the sheath 404 and/or from the printed bonding material 54. In some embodiments, additional layers may be provided between the core 402 and the sheath 404 for the purpose of blocking any break-through bonding and/or to reduce friction/drag between the components.

In a footwear context, the ability for certain yarn strands to retain some freedom to longitudinally translate may be important when designing adaptive containment or closure systems. For example, in the upper design shown in FIG. 18A-18B, yarn strands 52 may extend from eyelets 450 on a first, lateral side 22 of the throat 26, across an underfoot portion 452 and to eyelets 450 on the opposite, lateral side 24 of the throat 26. In some embodiments, these yarn strands 52 may comprise multi-layered yarn strands 400, similar to those illustrated in FIG. 16. The printed bonding material 54 may be utilized to bond these strands to additional yarn strands, to skrim material, or to other such structure that ensure that they remain in a generally stable relative positioning. These specific yarn strands may work in unison with a closure system 34 (e.g., a lace threaded through the eyelets) to adaptively constrict the upper around the wearer's foot with a somewhat uniform pressure. In other embodiments, these longitudinally translatable yarn strands may be used in conjunction with an adaptive/dynamic/ mechanized closure system, such as described in, for example US 2018/0125168, which is incorporated by reference in its entirety.

Figure 19:
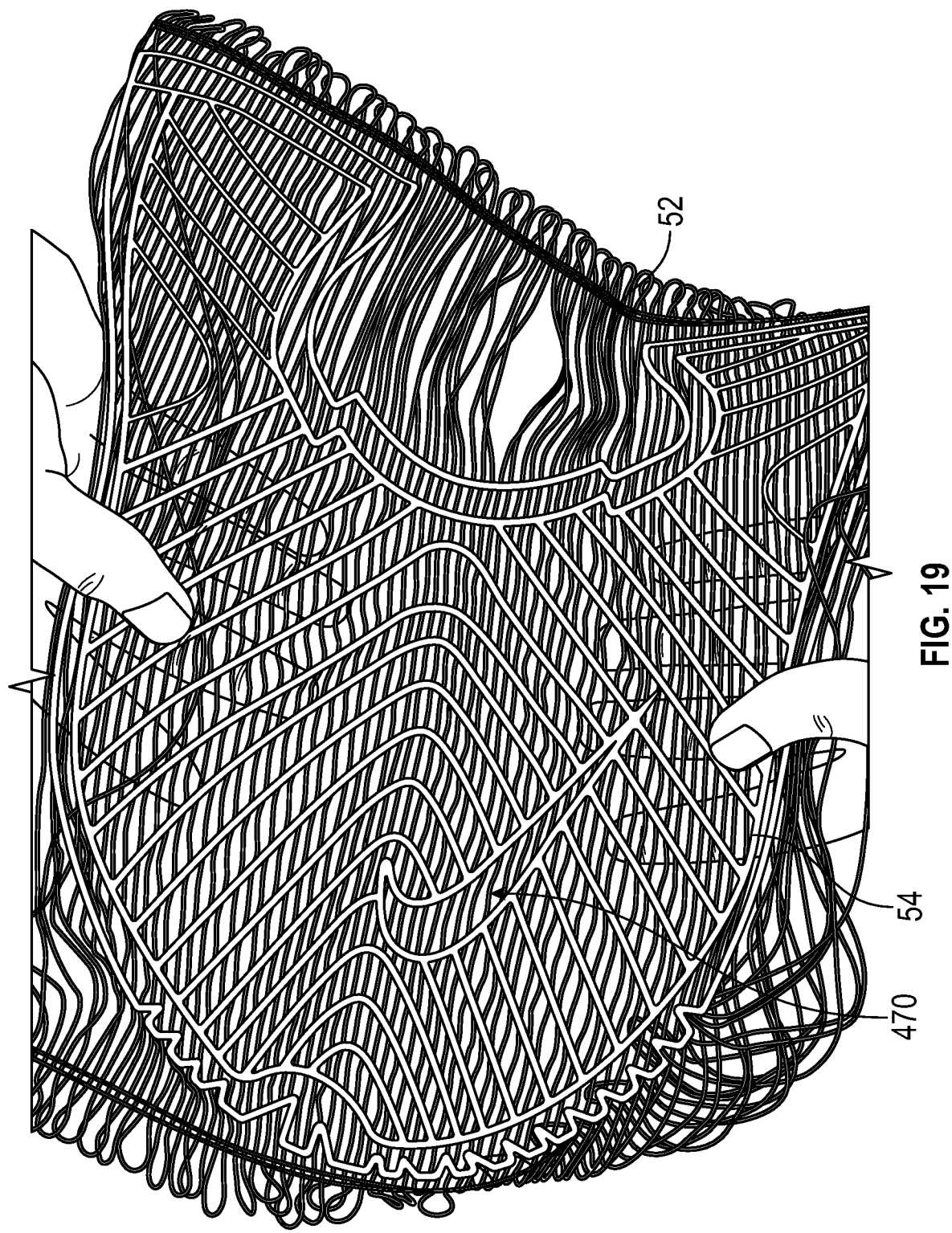
FIG. 19 is a schematic illustration of an engineered textile with an integral, polymer-formed logo formed across a plurality of yarn strands.
Figure 20:
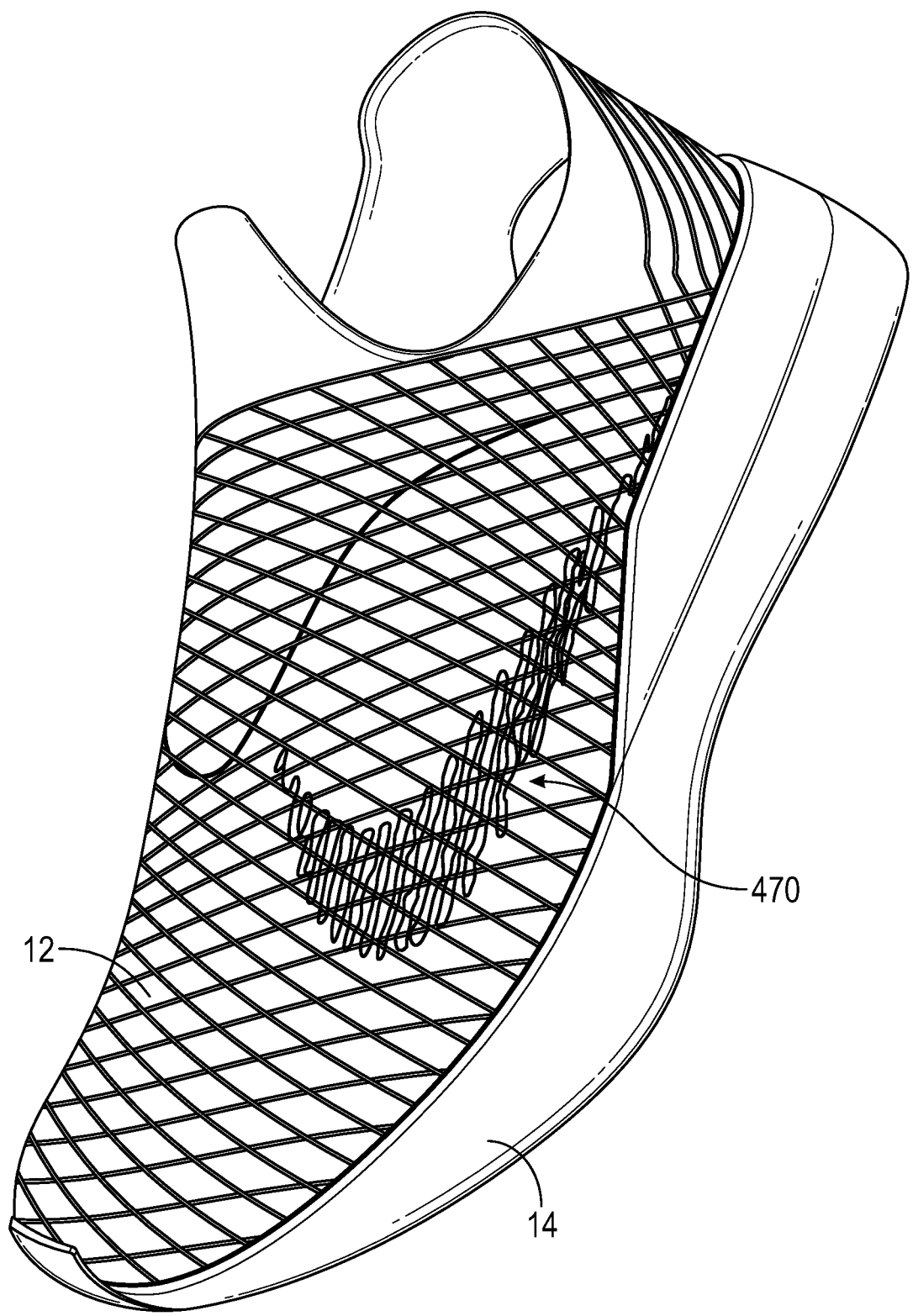
FIG. 20 is a schematic perspective view of an article of footwear with an additively applied polymeric logo printed across a plurality of yarn strands.
Figure 21:
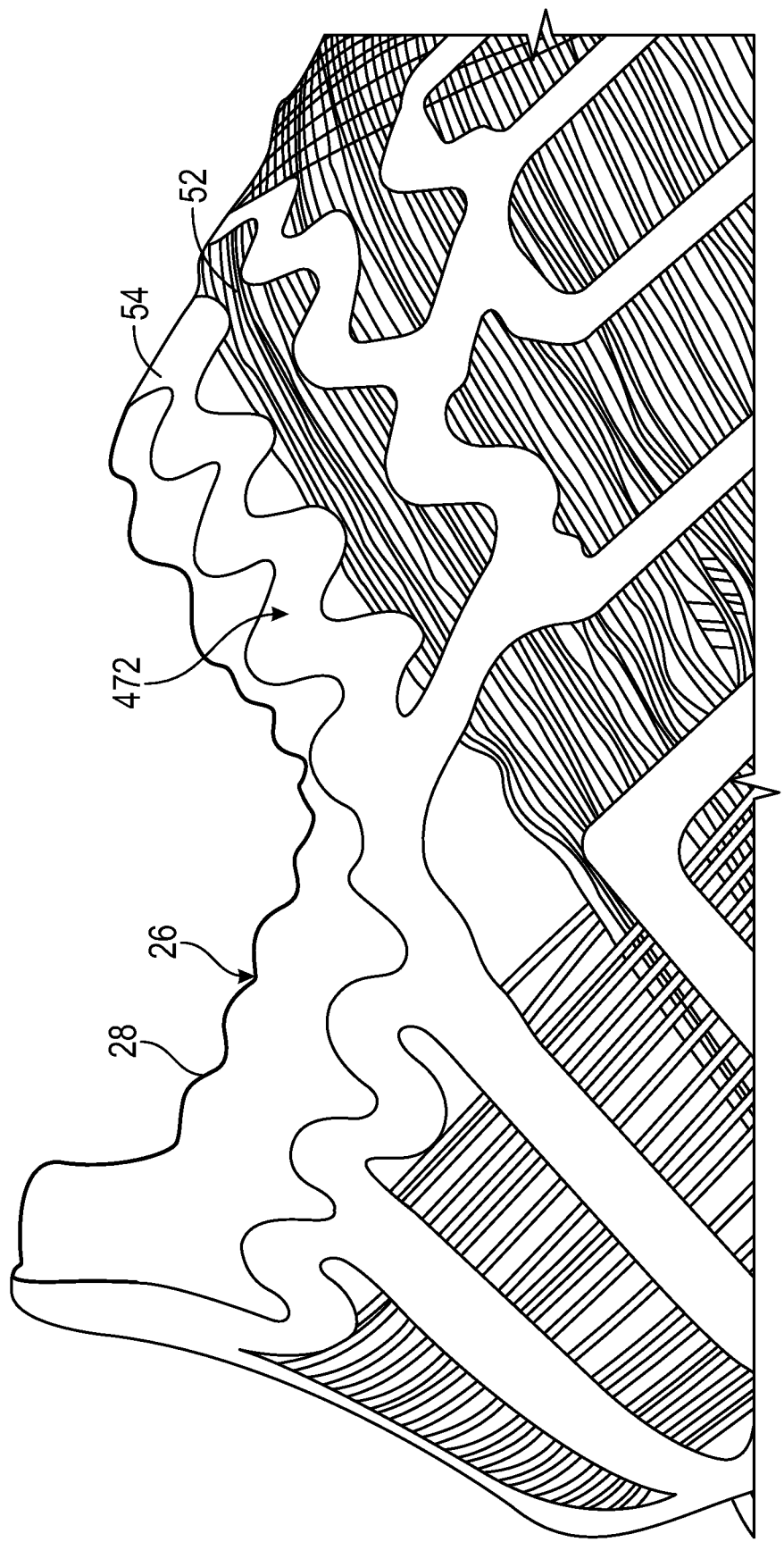
FIG. 21 is a schematic enlarged view of an ankle opening of an article of footwear having an applied polymer with a saw-tooth design induced elasticity.

In some embodiments, the bonding material may be printed onto the strands in a graphic design that includes a logo 470, text, or image, such as generally illustrated in FIGS. 19 and 20. Further, as generally illustrated in FIG. 21, the design/pattern itself may be arranged to have functionality independent of any graphical appearance. For example, in one embodiment, the design/pattern 472 of printed bonding material may provide some degree of design-induced elasticity, whereby the bonding material design 472 may straighten prior to any substantial material-based stretch occurring. Design-induced elasticity may come in the form of, for example, an alternating wave (e.g., square, saw-tooth/triangle, sinusoidal) that may straighten out to provide a design-induced stretch prior to the material itself stretching. In doing so, once the design reaches a point of maximum elongation, the fabric may appear to firm up/more strongly resist further deformation. In a shoe context, this design-induced stretch may be beneficial, for example, around the ankle opening 28 to aid a wearer in inserting their foot into the internal volume 26 of the upper 12.

Integral Shoe Portions

The present construction techniques provide tremendous design flexibility by allowing a designer to tune the directional elasticities of the fabric, while also optimizing the fabric's primary load paths to minimize shear stresses. In addition to these mechanical properties, the present techniques also provide a new level of functional design. More specifically, a designer may adapt the pattern or placement of the overlaid bonding material to provide functionality beyond just fabric integrity/yarn strand interconnection. For example, in a footwear context, the overlaid bonding material may be used to provide a cushioning or traction function and/or to aid in bonding the yarn strands with other materials such as discrete cushioning elements or trim elements. Further, stiffer/harder bonding materials may be additively applied to create discrete reinforcing panels, such as a heel counter or toe bumper.

Figure 22A:
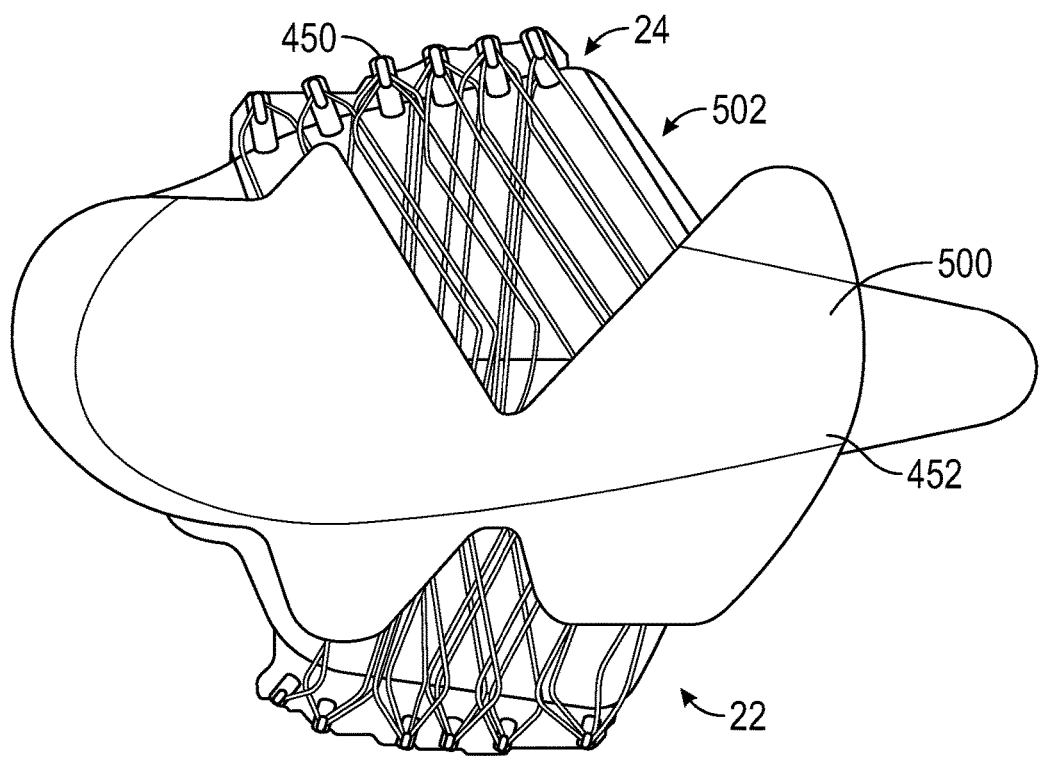
FIG. 22A is a schematic plan view of component of an upper having a polymer-adhered sole component.
Figure 22B:
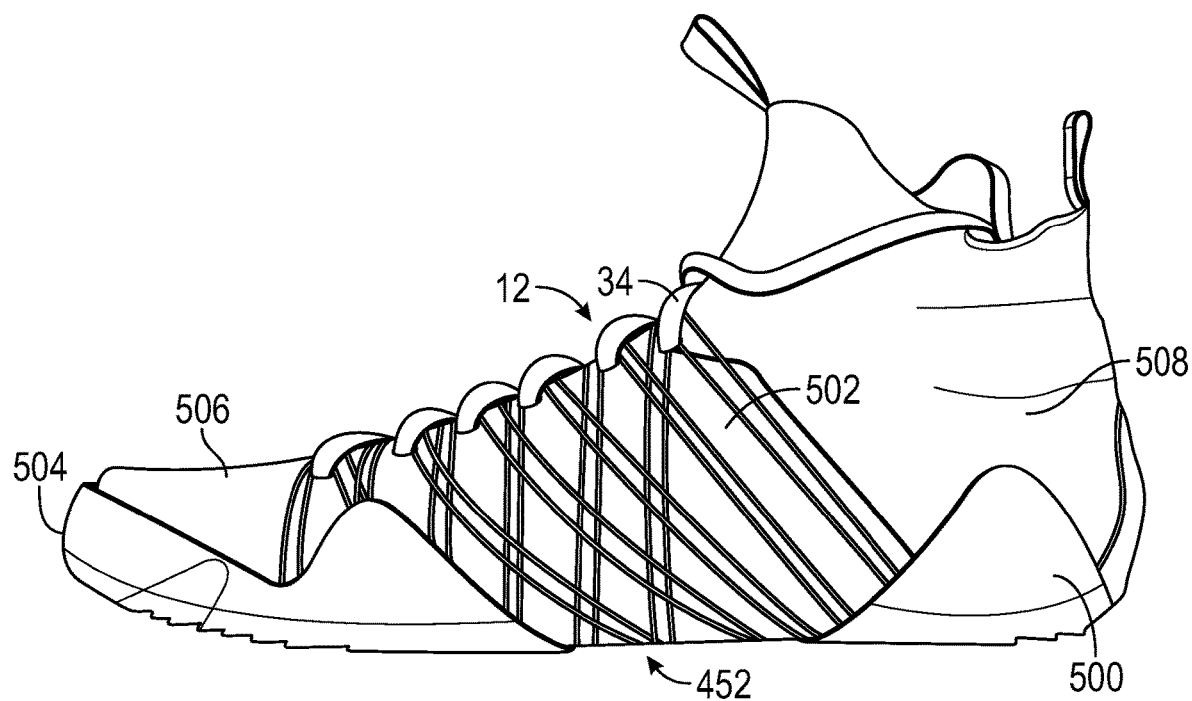
FIG. 22B is a schematic side view of an article of footwear formed in part from the upper component of FIG. 22A.

FIGS. 22A-22B schematically illustrate an embodiment of an article of footwear similar to that provided in FIGS. 18A-18B where the applied bonding material forms or otherwise couples a sole component 500 (e.g., an outsole) on an external surface of a containment portion 502 of an upper 12. As generally shown, this containment portion 502 may extend up the sidewalls and may directly engage with the closure 34 to create a proper tension fit around the wearer's foot. This containment portion 502 may extend from the medial side 24 of the article, across an underfoot portion 452, and to the lateral side of the article 22. This portion may further be secured to additional components to form other aspects of the toebox 504, vamp 506, rear quarters 508 and the like.

In this design, an integrated sole component 500 is attached to the underfoot portion 452 of the containment, though may further extend up portions of the medial and lateral sidewalls such as shown in FIG. 21B. In an embodiment, this sole component may either be the first layer of bonding material applied (i.e., bonding material directly printed to the substrate surface of the worktable), or the last layer of applied bonding material (i.e., to the upper surface of the assembly prior to final curing/hardening). While it was discussed above that the substrate surface may have a negative relief texture that could be transferred to the bonding material, in one configuration, it may also have a depression suitable to be filled with bonding material to form the entire sole component prior to laying down the yarn strands. In an alternate embodiment, the worktable/substrate surface may define a depression that suitably receives a prefabricated sole component/sole structure. This pre-made component may be inserted into the depression and then secured to the yarn strands/fabric via bonding with the printed bonding material (i.e., where the bonding material is used in place of an adhesive). In some embodiments, particularly in the case of thermoplastics, it may be desirable to thermally flash the upper surface of the component prior to applying the printed bonding material in an effort to promote bonding.

While FIGS. 22A-22B schematically illustrate the attachment of a sole component 500 to the textile, in the other embodiments, similar bonding material printing techniques may be used to attach ancillary embellishments to the textile, such as eyelets, logos, accents, mudguards, closures, and the like. Further, in some embodiments, these techniques may be used to trim the edge of the fabric (e.g., the edge of the fabric at the throat or ankle opening) with a foam and/or woven material to provide a more finished feel and appearance, such as illustrated in the heel portion 20 of FIG. 2. More specifically, such components may be pre-formed and bonded to the yarn strands/engineered textile using the applied bonding material as an adhesive (i.e., without use of other secondary bonding adhesives). As such, the additional material (foam, preformed polymer, woven material) or structure is simply another layer of the assembly. By using a miscible/compatible polymer, or polymer impregnated fabric, the pre-formed component may readily bond with the printed bonding material from the engineered textile, particularly if a thermal curing or bonding process is employed.

In addition to providing directionally optimized strength/elasticity properties, the presently described engineered textiles may also possess enhanced abrasion resistance by virtue of the overlaid bonding material protruding above the level of the yarn. As such, if the engineered textile were to brush against an abrasive surface, it would likely be the bonding material that would make initial contact rather than the yarn strands, which may more easily fray, snag, or tear. In instances where additional waterproofing may be desired, a thin film elastic membrane may be included with the fabric as one of the layers of the assembly. Such a membrane would ideally have sufficient elasticity two prevent the membrane from significantly affecting the material response of the fabric. In some embodiments, an elastic membrane may be laminated to the fabric on both sides such that all yarn strands are contained between two or more opposing membranes. In this manner, the possibility of inadvertently snagging a strand during normal use would further be reduced.

Further embodiments and examples of the present disclosure are provided in a in the following clauses:

Clause 1. A method of creating an engineered textile comprising: placing a yarn-wound jig on an upper surface of a substrate, the yarn-wound jig including: a frame defining a central area; a plurality of retention features provided along an outer perimeter of the central area and extending outward from the frame; and a plurality of arranged yarn strands, each yarn strand of the plurality of arranged yarn strands extending across the central area of the frame and between two of the plurality of retention features; selectively printing or extruding a bonding material across the plurality of arranged yarn strands; solidifying the bonding material to bond adjacent ones of the plurality of arranged yarn strands together and form a bound plurality of arranged yarn strands, removing the bound plurality of arranged yarn strands from the substrate and the frame, the bound plurality of arranged yarn strands forming the engineered textile.

Clause 2. The method of clause 1, wherein the bonding material that is selectively printed or extruded across the plurality of arranged yarn strands defines a first bonding material layer; the method further comprising selectively printing or extruding the bonding material on the substrate to form a second bonding material layer prior to placing the yarn-wound jig on the upper surface of the substrate; and wherein the first bonding material layer contacts the second bonding material layer between adjacent yarn strands; and wherein solidifying the bonding material operatively bonds the first bonding material layer with the second bonding material layer.

Clause 3. The method of clause 2, wherein the yarn-wound jig is a first yarn-wound jig, the plurality of arranged yarn strands are a first plurality of yarn strands ; the method further comprising placing a second yarn-wound jig on the first yarn-wound jig, the second yarn-wound jig including: a second frame defining a central area; a second plurality of retention features provided along an outer perimeter of the central area and extending outward from the second frame; and a second plurality of arranged yarn strands, each yarn strand of the second plurality of arranged yarn strands extending across the central area of the second frame and between two of the second plurality of retention features; selectively printing or extruding the bonding material across the second plurality of arranged yarn strands.

Clause 4. The method of clause 3, wherein the solidifying further bonds the first plurality of arranged yarn strands to the second plurality of arranged yarn strands.

Clause 5. The method of any of clauses 1-4, further comprising placing a pre-formed material component on the plurality of arranged yarn strands, and wherein the solidifying of the bonding material further bonds the pre-formed material component to the plurality of arranged yarn strands.

Clause 6. The method of any of clauses 1-5, further comprising winding a continuous length of yarn around the plurality of retention features to form the plurality of arranged yarn strands.

Clause 7. The method of any of clauses 1-6, further comprising orienting the yarn-wound jig such that the plurality of retention features extend from the frame toward the substrate and; wherein placing a yarn-wound jig on an upper surface of a substrate comprises placing the yarn-wound jig on or around the substrate such that the retention features extend below the upper surface of the substrate.

Clause 8. The method of any of clauses 1-7, wherein two or more yarn strands in a subset of the plurality of arranged yarn strands are substantially parallel.

Clause 9. The method of any of clauses 1-8, wherein the plurality of arranged yarn strands includes a first subset of yarn strands overlaying a second subset of yarn strands; and wherein, within the center area of the frame, the first subset of yarn strands is interconnected with the second subset of yarn strands only via the bonding material.

Clause 10. The method of any of clauses 1-9, wherein selectively printing or extruding the bonding material across the plurality of arranged yarn strands further comprises: for each yarn strand within plurality of arranged yarn strands, forming a plurality of bonded portions of the yarn strand, wherein each bonded portion of the yarn strand is in direct contact with the bonding material; wherein, along the length of the yarn strand, the bonded portions of the yarn strand alternate with unbonded portions of the yarn strand, and wherein the unbonded portions of the yarn strand are not in direct contact with the bonding material.

Clause 11. The method of any of clauses 1-10, wherein selectively printing or extruding the bonding material to the plurality of arranged yarn strands comprises printing the bonding material onto the plurality of arranged yarn strands using a computer-controlled printer having a print nozzle operative to expel the bonding material.

Clause 12. The method of any of clauses clause 1-11, further comprising: winding a continuous length of a first yarn around a first subset of the plurality of retention features to form a first subset of the plurality of arranged yarn strands; winding a continuous length of a second yarn around a second subset of the plurality of retention features to form a second subset of the plurality of arranged yarn strands; and wherein: each yarn strand in the first subset of the plurality of arranged yarn strands is aligned along a first common direction and has a first material elasticity; each yarn strand in the second subset of the plurality of arranged yarn strands is aligned along a second common direction and has a second material elasticity; the first common direction is different than the second common direction; and the first material elasticity is different than the second material elasticity.

Clause 13. The method of clause 12, wherein winding the continuous length of the first yarn around the first subset of the plurality of retention features occurs simultaneously with the winding of the continuous length of the second yarn around the second subset of the plurality of retention features.

Clause 14. The method of any of clauses 12-13, wherein the first common direction is oblique to the second common direction.

Clause 15. The method of clause 13, wherein winding the continuous length of the first yarn occurs via a common computer controlled winding head as the winding of the continuous length of the second yarn around the second subset of the plurality of retention features.

Clause 16. The method of any of clause 1-15, wherein the bonding material comprises a polymer chosen from a polyester, a polyamide, a polyolefin, a polyacetate, a polyurethane, or any combination thereof, and wherein curing or solidifying the polymeric material comprises initiating a cross-linking reaction thereby crosslinking the polymer(s).

Clause 17. The method of any of clauses 1-16 further comprising: using the engineered textile to construct an article of apparel or footwear.

Clause 18. An engineered textile comprising: a plurality of yarn strands including a subset extending in a substantially parallel and spaced arrangement; an bonding material extending across the plurality of yarn strands, the bonding material encapsulating a portion of each yarn strand to bond adjacent ones of the plurality of yarn strands together; and wherein the plurality of yarn strands are bonded together only via the bonding material.

Clause 19. The engineered textile of clause 18, wherein the subset of the plurality of yarn strands is a first subset provided in a first layer and extending in a first common direction; the engineered textile further comprising a second subset of the plurality of yarn strands provided within a second layer abuts the first layer, wherein the yarn strands within the second subset are provided in a substantially parallel and spaced arrangement along a second common direction; wherein the bonding material encapsulates a portion of each yarn strand of the second plurality of yarn strands to bond adjacent ones of the second plurality of yarn strands together; and wherein the bonding material further bonds the first layer with the second layer.

Clause 20 The engineered textile of clause 19, wherein the first common direction is oblique to the second common direction.

Clause 21. The engineered textile of clause 20, wherein the first subset of the plurality of yarn strands has a different material elasticity than the second subset of the plurality of yarn strands.

Clause 22. The engineered textile of any of clauses 18-21, wherein the bonding material extends across the plurality of yarn strands in a saw tooth pattern to provide a design-induced elasticity.

Clause 23. The engineered textile of any of clauses 18-22, further comprising a foam or woven fabric, and wherein the bonding material is further operative to bond the foam or woven fabric to the plurality of yarn strands.

Clause 24. The engineered textile of clause 23, wherein the foam or woven fabric is secured to and extends across the plurality of yarn strands.

Clause 25. The engineered textile of any of clauses 18-24, wherein the bonding material extends between the plurality of yarn strands and the foam or woven fabric; and wherein the foam or woven fabric is secured to the plurality of yarn strands only via the bonding material.

Clause 26. An article of apparel comprising an engineered textile constructed according to the methods of any of clauses 1-17.

Clause 27. The article of apparel of clause 26, wherein the article of apparel is an article of footwear.

Clause 28. The article of apparel of clause 27, wherein the article of footwear includes an upper and a sole structure, the upper comprising a vamp, a medial sidewall portion and a lateral sidewall portion; and wherein at least one of the vamp, the medial sidewall portion and the lateral sidewall portion comprises the engineered textile.

Clause 29. The article of apparel of clause 28, wherein the vamp, the medial sidewall portion and the lateral sidewall portion each comprise the engineered textile.

Clause 30. The article of apparel of clause 26, wherein the article of apparel is a bra, compression shorts, compression pants, compression shirt, compression sleeve, ankle brace, knee brace, wrist brace, elbow brace, backpack, bag, or watch band.

Clause 31. An article of apparel comprising the engineered textile of any of clauses 18-25.

Clause 32. The article of apparel of clause 31, wherein the article of apparel is an article of footwear.

Clause 33. The article of apparel of clause 32, wherein the article of footwear includes an upper and a sole structure, the upper comprising a vamp, a medial sidewall portion and a lateral sidewall portion; and wherein at least one of the vamp, the medial sidewall portion and the lateral sidewall portion comprises the engineered textile.

Clause 34. The article of apparel of clause 33, wherein the vamp, the medial sidewall portion and the lateral sidewall portion each comprise the engineered textile.

Clause 35. The article of apparel of clause 31, wherein the article of apparel is a bra, compression shorts, compression pants, compression shirt, compression sleeve, ankle brace, knee brace, wrist brace, elbow brace, backpack, bag, or watch band.

Clause 36. The method of any of clauses 1-17, the engineered textile of any of clauses 18-25 or the article of apparel of any of clauses 26-34, wherein the bonding material comprises a thermoplastic polymer, an elastomeric polymer, a thermoplastic elastomer, and/or a thermoset polymer.

Clause 37. The method of any of clauses 1-15, the engineered textile of any of clauses 18-25 or the article of apparel of any of clauses 26-34, wherein the bonding material comprises or consists essentially of one or more of a thermoplastic styrene-ethylene/butylene-styrene (SEBS) block copolymer elastomer, a polybutadiene or polyisoprene, or a polysilane or polysiloxane, a thermoplastic vulcanizate (TPV), a polyurethane, a polyurea, a polyester, a polyether, a vinyl polymer, a polyolefin, an acetate polymer, an acrylate or methacrylate polymer, a polystyrene, a polysilane, a polysiloxane, a polycarbonate, a polyurethane, including a polyurethane chosen from an elastomeric polyurethane, a thermoplastic polyurethane (TPU), an elastomeric TPU, a polyurethane copolymer such as a polyester-polyurethane or a polyether-polyurethane, a polyamide homopolymer, a polyamide copolymer, including a polyether block polyamide (PEBA) copolymer, a vinyl copolymer such as ethylene-vinyl acetate (EVA) or ethylene-vinyl alcohol (EVOH), a polyolefin homopolymer or copolymer, such as a polypropylene or polyethylene homopolymer, or a copolymer of propylene or ethylene, a styrene copolymer such as poly(styrene-butadiene-styrene) (SBS), or a styrene-ethylene/butylene-styrene (SEBS) block copolymer, a polyester, a polyamide, a polyurethane, and/or a polyolefin.

Clause 38. The method of any of clauses 1-17, the engineered textile of any of clauses 18-25 or the article of apparel of any of clauses 26-34, wherein the yarn strand includes a yarn comprising a monofilament yarn, a multi-filament yarn, a spun yarn, and/or a complex yarn consisting of a cord or cabled yarn or consisting of two or more single yarn strands combined into a ply yarn.

Clause 39. Wherein the yarn of clause 38 includes one or more fibers or filaments comprising naturally occurring cellulosic fibers or filaments, naturally-occurring protein-based fibers or filaments, naturally-occurring mineral-based materials, fibers or filaments made from inorganic materials, fibers or filaments made from regenerated natural polymers including cellulose-based polymers and protein-based polymers, man-made carbon fibers or filaments, and/or man-made fibers or filaments made from synthetic polymers.

Clause 41. An article of footwear comprising: an upper, and a sole structure coupled with the upper; the upper having an outer wall that defines a cavity adapted to receive a foot of a wearer, wherein the outer wall is at least partially formed from a engineered textile comprising: a plurality of yarn strands extending in an aligned and spaced arrangement; a bonding material extending across and between adjacent ones of the plurality of yarn strands, the bonding material encapsulating a portion of each yarn strand to bind the adjacent ones of the plurality of yarn strands together.

Clause 42. The article of footwear of clause 41, wherein yarn strands of the plurality of yarn strands are obliquely aligned relative to each other.

Clause 43. The article of footwear of any of clauses 41-42, wherein a subset of the plurality of yarn strands are parallel to each other and extend in a non-overlapping arrangement.

Clause 44. The article of footwear of any of clauses 41-43, wherein the bonding material has a material elasticity of between 200% and 400%

Clause 45. The article of footwear of any of clauses 41-44, wherein the bonding material is a cross-linked polyurethane.

Clause 46. The article of footwear of any of clauses 41-45, wherein the bonding material extends across the plurality of yarn strands in a saw tooth or sinusoidal pattern to provide a design-induced elasticity.

Clause 47. The article of footwear of any of clauses 41-46, wherein the outer wall further comprises a foam or woven fabric panel, and wherein the bonding material is further operative to bind the foam or woven fabric panel to a subset of the plurality of yarn strands.

Clause 48. The article of footwear of clause 47, wherein the foam or woven fabric panel extends across the subset of the plurality of yarn strands and is bound to the subset of the plurality of yarn strands only via the bonding material.

Clause 49. The article of footwear of any of clauses 41-48, further comprising a bite line defined at a location where the outer wall meets the sole structure, and wherein the upper further includes an ankle opening, a throat extending from the ankle opening, and a vamp; and wherein: a first subset of the plurality of yarn strands extend from the bite line to the throat; and a second subset of the plurality of yarn strands extend across the vamp from the bite line to the bite line.

Clause 50. The article of footwear of any of clauses 41-49, wherein the plurality of yarn strands includes: a first subset of yarn strands having a first material elasticity; a second subset of yarn strands having a second material elasticity that is different than the first material elasticity; and wherein each yarn strand of the first subset of yarn strands is oriented at an oblique angle relative to each yarn strand of the second subset of yarn strands.

Clause 51. The article of footwear of clause 50, wherein the first subset of yarn strands overlaps the second subset of yarn strands.

Clause 52. The article of footwear of any of clauses 41-51, wherein a portion of the outer wall consists only of the plurality of yarn strands and the bonding material between an inner-most surface of the outer wall and an outer-most surface of the outer wall.

Clause 53. The article of footwear of any of clauses 41-52, wherein each of the plurality of yarn strands has an average diameter; and wherein adjacent yarn strands of the plurality of yarn strands are spaced apart from each other by a distance of between one and 10 times the average diameter.

Clause 54. The article of footwear of any of clauses 41-53, wherein the bonding material comprises or consists essentially of one or more of a thermoplastic styrene-ethylene/butylene-styrene (SEBS) block copolymer elastomer, a polybutadiene or polyisoprene, or a polysilane or polysiloxane, a thermoplastic vulcanizate (TPV), a polyurethane, a polyurea, a polyester, a polyether, a vinyl polymer, a polyolefin, an acetate polymer, an acrylate or methacrylate polymer, a polystyrene, a polysilane, a polysiloxane, a polycarbonate, a polyurethane, including a polyurethane chosen from an elastomeric polyurethane, a thermoplastic polyurethane (TPU), an elastomeric TPU, a polyurethane copolymer such as a polyester-polyurethane or a polyether-polyurethane, a polyamide homopolymer, a polyamide copolymer, including a polyether block polyamide (PEBA) copolymer, a vinyl copolymer such as ethylene-vinyl acetate (EVA) or ethylene-vinyl alcohol (EVOH), a polyolefin homopolymer or copolymer, such as a polypropylene or polyethylene homopolymer, or a copolymer of propylene or ethylene, a styrene copolymer such as poly(styrene-butadiene-styrene) (SBS), or a styrene-ethylene/butylene-styrene (SEBS) block copolymer, a polyester, a polyamide, a polyurethane, and/or a polyolefin.

Clause 55, The article of footwear of any of clauses 41-54, wherein the yarn strand includes a yarn comprising a monofilament yarn, a multi-filament yarn, a spun yarn, and/or a complex yarn consisting of a cord or cabled yarn or consisting of two or more single yarn strands combined into a ply yarn.

Clause 56. The article of footwear of clause 55, wherein the yarn includes one or more fibers or filaments comprising naturally occurring cellulosic fibers or filaments, naturally-occurring protein-based fibers or filaments, naturally-occurring mineral-based materials, fibers or filaments made from inorganic materials, fibers or filaments made from regenerated natural polymers including cellulose-based polymers and protein-based polymers, man-made carbon fibers or filaments, and/or man-made fibers or filaments made from synthetic polymers.

What is claimed:

1. A method of creating an engineered textile comprising:
   selectively printing or extruding a first bonding material on a substrate;
   placing a yarn-wound jig on an upper surface of a substrate, the yarn-wound jig including:
      a frame defining a central area;
      a plurality of retention features provided along an outer perimeter of the central area and extending outward from the frame; and
      a first plurality of arranged yarn strands, each yarn strand of the plurality of arranged yarn strands extending across the central area of the frame and between two of the plurality of retention features;
   selectively printing or extruding a second bonding material across the first plurality of arranged yarn strands and further into contact with the first bonding material;
   solidifying the second bonding material to bond adjacent ones of the first plurality of arranged yarn strands together and form a bound plurality of arranged yarn strands; and
   removing the bound plurality of arranged yarn strands from the substrate and the frame, the bound plurality of arranged yarn strands forming the engineered textile.

2. The method of claim 1, wherein the yarn-wound jig is a first yarn-wound jig, the plurality of arranged yarn strands are a first plurality of yarn strands;
   the method further comprising placing a second yarn-wound jig on the first yarn-wound jig, the second yarn-wound jig including:
      a second frame defining a central area;
      a second plurality of retention features provided along an outer perimeter of the central area and extending outward from the second frame; and
      a second plurality of arranged yarn strands, each yarn strand of the second plurality of arranged yarn strands extending across the central area of the second frame and between two of the second plurality of retention features;
   selectively printing or extruding the bonding material across the second plurality of arranged yarn strands.

3. The method of claim 2, wherein the solidifying further bonds the first plurality of arranged yarn strands to the second plurality of arranged yarn strands.

4. The method of claim 1, further comprising placing a pre-formed material component on the plurality of arranged yarn strands, and wherein the solidifying of the bonding material further bonds the pre-formed material component to the plurality of arranged yarn strands.

5. The method of claim 1, further comprising winding a continuous length of yarn around the plurality of retention features to form the plurality of arranged yarn strands.

6. The method of claim 1, further comprising orienting the yarn-wound jig such that the plurality of retention features extend from the frame toward the substrate and;
   wherein placing a yarn-wound jig on an upper surface of a substrate comprises placing the yarn-wound jig on or around the substrate such that the retention features extend below the upper surface of the substrate.

7. The method of claim 1, wherein two or more yarn strands in a subset of the plurality of arranged yarn strands are substantially parallel.

8. The method of claim 1, wherein the plurality of arranged yarn strands includes a first subset of yarn strands overlaying a second subset of yarn strands; and
   wherein, within the center area of the frame, the first subset of yarn strands is interconnected with the second subset of yarn strands only via the bonding material.

9. The method of claim 1, wherein selectively printing or extruding the bonding material across the plurality of arranged yarn strands further comprises:
   for each yarn strand within plurality of arranged yarn strands, forming a plurality of bonded portions of the yarn strand, wherein each bonded portion of the yarn strand is in direct contact with the bonding material;
   wherein, along the length of the yarn strand, the bonded portions of the yarn strand alternate with unbonded portions of the yarn strand, and
   wherein the unbonded portions of the yarn strand are not in direct contact with the bonding material.

10. The method of claim 1, wherein selectively printing or extruding the bonding material to the plurality of arranged yarn strands comprises printing the bonding material onto the plurality of arranged yarn strands using a computer controlled printer having a print nozzle operative to expel the bonding material.

11. The method of claim 1, further comprising:
   winding a continuous length of a first yarn around a first subset of the plurality of retention features to form a first subset of the plurality of arranged yarn strands;

winding a continuous length of a second yarn around a second subset of the plurality of retention features to form a second subset of the plurality of arranged yarn strands; and wherein:

each yarn strand in the first subset of the plurality of arranged yarn strands is aligned along a first common direction and has a first material elasticity;

each yarn strand in the second subset of the plurality of arranged yarn strands is aligned along a second common direction and has a second material elasticity;

the first common direction is different than the second common direction; and the first material elasticity is different than the second material elasticity.

12. The method of claim 11, wherein winding the continuous length of the first yarn around the first subset of the plurality of retention features occurs simultaneously with the winding of the continuous length of the second yarn around the second subset of the plurality of retention features.

13. The method of claim 11, wherein the first common direction is oblique to the second common direction.

14. The method of claim 12, wherein winding the continuous length of the first yarn occurs via a common computer controlled winding head as the winding of the continuous length of the second yarn around the second subset of the plurality of retention features.

15. The method of claim 1, wherein the bonding material comprises a polymer chosen from a polyester, a polyamide, a polyolefin, a polyacetate, a polyurethane, or any combination thereof, and wherein curing or solidifying the polymeric material comprises initiating a cross-linking reaction thereby crosslinking the polymer(s).

16. The method of claim 1 further comprising: using the engineered textile to construct an article of apparel or footwear.

* * * * *